US012278493B2

(12) United States Patent
Bozchalui

(10) Patent No.: US 12,278,493 B2
(45) Date of Patent: Apr. 15, 2025

(54) STORAGE SYSTEM CONFIGURED FOR USE WITH AN ENERGY MANAGEMENT SYSTEM

(71) Applicant: Enphase Energy, Inc., Petaluma, CA (US)

(72) Inventor: Mohammad Chehreghani Bozchalui, Fremont, CA (US)

(73) Assignee: Enphase Energy, Inc., Petaluma, CA (US)

( * ) Notice: Subject to any disclaimer, the term of this patent is extended or adjusted under 35 U.S.C. 154(b) by 30 days.

(21) Appl. No.: 18/216,398

(22) Filed: Jun. 29, 2023

(65) Prior Publication Data
US 2023/0344232 A1 Oct. 26, 2023

Related U.S. Application Data

(63) Continuation of application No. 17/145,793, filed on Jan. 11, 2021, now Pat. No. 11,735,924.
(Continued)

(51) Int. Cl.
H02J 3/32 (2006.01)
H02J 13/00 (2006.01)

(52) U.S. Cl.
CPC .......... *H02J 3/32* (2013.01); *H02J 13/00001* (2020.01); *H02J 13/00007* (2020.01); *H02J 13/00022* (2020.01)

(58) Field of Classification Search
CPC .. H02J 3/32; H02J 13/00001; H02J 13/00007; H02J 13/00022; H02J 3/144;
(Continued)

(56) References Cited

U.S. PATENT DOCUMENTS 8,836,286 B2 9/2014 Zhang et al.
9,136,732 B2 9/2015 Wolter et al.
(Continued)

FOREIGN PATENT DOCUMENTS

CN 100589306 C 2/2010
JP H-1189242 A 3/1999
(Continued)

OTHER PUBLICATIONS

Enphase. Planning an Enphase Ensemble Energy Management Technology System, Dec. 17, 2019 [retrieved on Apr. 20, 2021]. Retrieved from the Internet: <URL: https://www.solarelectricsupply.com/media/custom/upload/Tech-Brief-Planning-Ensemble-Technology-System-EN-US.pdf>. pp. 1-14; and figures 2-5.
(Continued)

*Primary Examiner* — Rexford N Barnie
*Assistant Examiner* — Thai H Tran
(74) *Attorney, Agent, or Firm* — Moser Taboada

(57) ABSTRACT

A storage system configured for use with an energy management system is provided and includes a single-phase AC coupled battery or a three-phase AC coupled battery, a plurality of microinverters that are configured to connect to one or more battery cells that form a local grid, a controller configured to detect when to charge or discharge the single-phase AC coupled battery or the three-phase AC coupled battery so that energy can be stored therein when energy is abundant and used when energy is scarce, an estimator tool for storage system sizing and photovoltaic sizing, and at least one of a configurable single-phase AC coupled battery and three-phase AC coupled battery profiles to optimize at least one of self-consumption or time-of-use or troubleshooting capabilities to identify and fix issues with the energy management system.

18 Claims, 15 Drawing Sheets

Related U.S. Application Data

(60) Provisional application No. 62/959,419, filed on Jan. 10, 2020.

(58) Field of Classification Search
CPC ......... H02J 3/381; H02J 7/35; Y02B 70/3225; Y02E 10/50; Y02E 10/56; Y02E 60/00; Y02E 60/10; Y04S 20/222; Y04S 40/121; Y04S 40/126
See application file for complete search history.

(56) References Cited

U.S. PATENT DOCUMENTS

| | | | |
|---|---|---|---|
| 9,960,637 B2 | 5/2018 | Sanders et al. | |
| 2008/0278983 A1 | 11/2008 | Park | |
| 2009/0000654 A1 | 1/2009 | Rotzoll et al. | |
| 2009/0079385 A1 | 3/2009 | Xiao et al. | |
| 2009/0115393 A1 | 5/2009 | Yoshida et al. | |
| 2009/0154384 A1* | 6/2009 | Todd | H04W 28/02 370/311 |
| 2010/0060229 A1† | 3/2010 | Benn | |
| 2010/0156185 A1 | 6/2010 | Kim et al. | |
| 2012/0068540 A1 | 3/2012 | Luo et al. | |
| 2014/0074311 A1* | 3/2014 | Kearns | H02J 3/38 700/297 |
| 2015/0015210 A1* | 1/2015 | Bradwell | H02J 7/00 429/103 |
| 2016/0020612 A1 | 1/2016 | Rotzoll et al. | |
| 2016/0109916 A1 | 4/2016 | Li et al. | |
| 2016/0118789 A1 | 4/2016 | Fornage | |
| 2016/0141894 A1 | 5/2016 | Beaston | |
| 2017/0149248 A1† | 5/2017 | Della Sera | |
| 2018/0301914 A1* | 10/2018 | Fornage | H02J 7/0014 |
| 2020/0336003 A1* | 10/2020 | Narla | H02J 7/007 |

FOREIGN PATENT DOCUMENTS

| | | |
|---|---|---|
| JP | 2012-019653 A | 1/2012 |
| JP | 6235408 B2 † | 12/2015 |
| JP | 2018-093573 A | 6/2018 |
| JP | 2019-122150 A | 7/2019 |
| KR | 101426359 B1 | 8/2014 |

OTHER PUBLICATIONS

International Search Report and written Opinion, dated May 6, 2021, International Application No. PCT/US2021/012894.

\* cited by examiner
† cited by third party

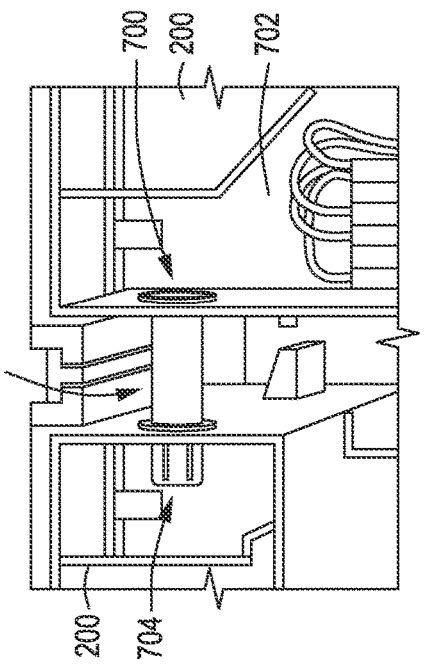
FIG. 5B
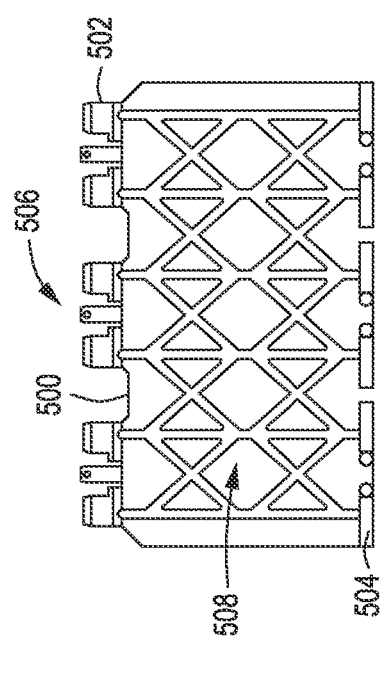
FIG. 5A
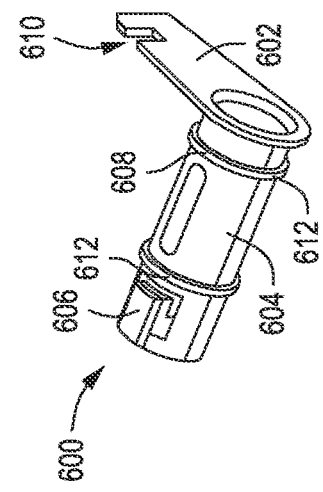
FIG. 7
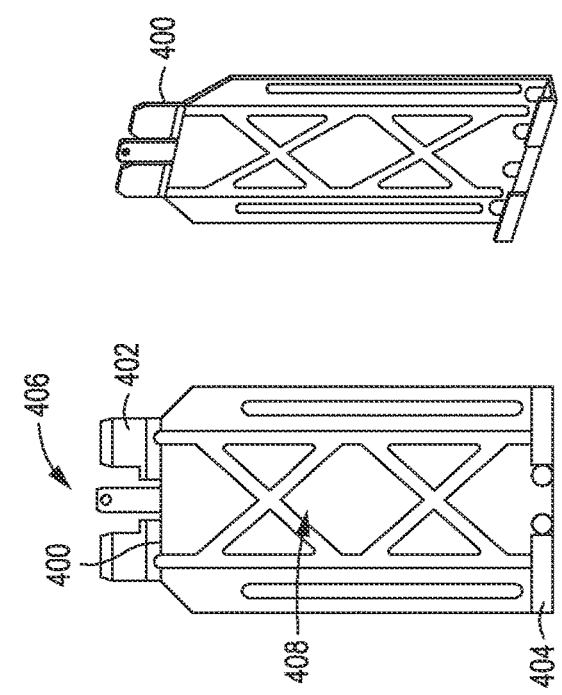
FIG. 4B
FIG. 4A
FIG. 6

FIG. 11

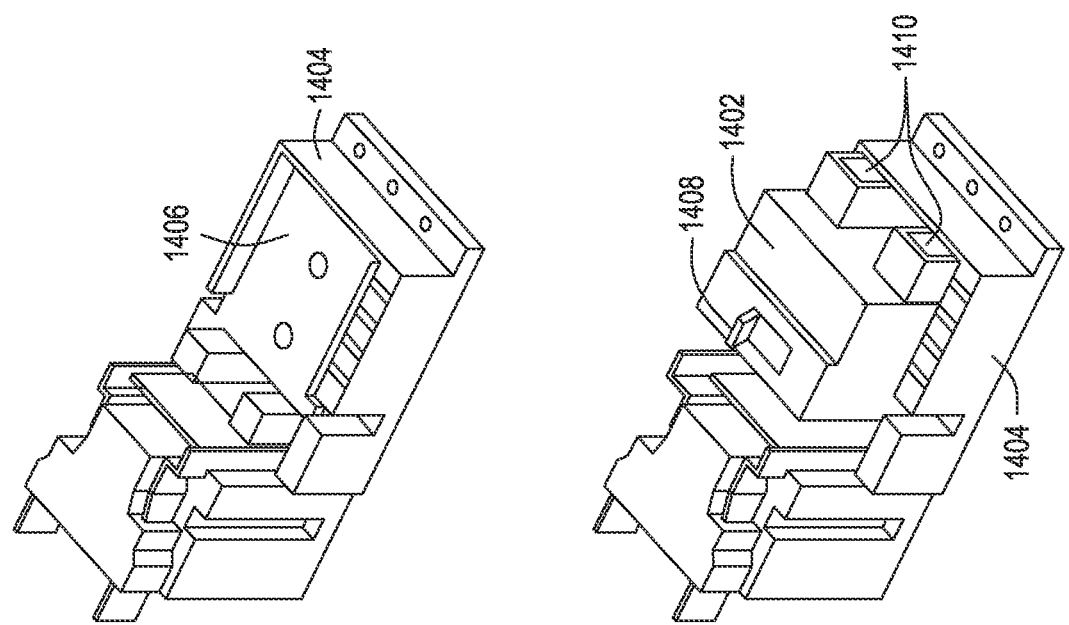
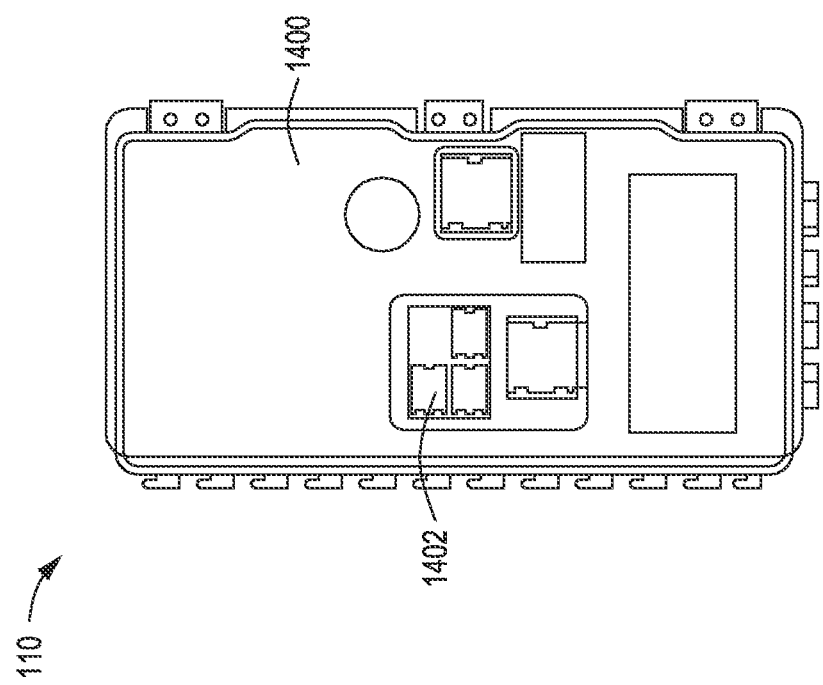
FIG. 14

STORAGE SYSTEM CONFIGURED FOR USE WITH AN ENERGY MANAGEMENT SYSTEM

CROSS-REFERENCE TO RELATED APPLICATIONS

This application is a continuation application of U.S. patent application Ser. No. 17/145,793, which was filed on Jan. 11, 2021, and which claims priority to and the benefit of U.S. Provisional Patent Application Ser. No. 62/959,419, which was filed on Jan. 10, 2020, the entire contents of each of these applications is incorporated herein by reference.

BACKGROUND

1. Field of the Disclosure

Embodiments of the present disclosure generally relate to power systems and, more particularly, to storage systems configured for use with energy management systems.

2. Description of the Related Art

A grid-tied solar photovoltaic (PV) system is a solar energy system that is connected (or tied) to a utility electrical grid and operates if the grid is available. During a power outage, the grid-tied PV system stops generating power, and remains shut down until the grid power become available.

Homes are, typically, built with a main panel sized for connection to a specific amount of resource loads and utility connection. This specific amount is determined by NEC section 705 of the National Electric Code (NEC) that prevents installation of resources beyond the capabilities of the main panel. Adding new PV circuits or battery storage systems to an existing home can lead to a situation where the total amount of resources connected to the panel exceeds the limitation of the main panel. Conventional methods for dealing with this limitation of the main panels sometimes include: (1) installing PV circuits and storage up to the maximum limit of the main panel, which can be very restrictive; and (2) upgrading the main panel to a larger sized panel that can accept more PV and storage, which can lead to additional expenditures.

SUMMARY

In accordance with some aspects of the present disclosure, a storage system configured for use with an energy management system comprises a single-phase AC coupled battery or a three-phase AC coupled battery, a plurality of microinverters that are configured to connect and a controller configured to detect when to charge or discharge the single-phase AC coupled battery or the three-phase AC coupled battery so that energy can be stored therein when energy is abundant and used when energy is scarce.

In accordance with some aspects of the present disclosure, a storage system configured for use with an energy management system comprises a single-phase AC coupled battery or a three-phase AC coupled battery, a plurality of microinverters that are configured to connect and a controller configured to detect when to charge or discharge the single-phase AC coupled battery or the three-phase AC coupled battery so that energy can be stored therein when energy is abundant and used when energy is scarce.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only a typical embodiment of this disclosure and are therefore not to be considered limiting of its scope, for the disclosure may admit to other equally effective embodiments.

FIGS. 4A and 4B are front and perspective views, respectively, of a wall mount bracket for the SP battery, in accordance with at least some embodiments of the present disclosure.

FIGS. 5A and 5B are front and perspective views, respectively, of a wall mount bracket for the 3P battery, in accordance with at least some embodiments of the present disclosure.

FIG. 6 is a perspective view of a raceway, in accordance with at least some embodiments of the present disclosure.

FIG. 7 is a diagram of the raceway of FIG. 6 installed on adjacent SP batteries, in accordance with at least some embodiments of the present disclosure.

FIG. 11 is a diagram of a screen shoot of a cloud interface for use with the energy management system, in accordance with at least some embodiments of the present disclosure.

FIG. 14 includes diagrams of a circuit breaker installation, lugs at a main breaker position, and a breaker installed at a main breaker position for the smart switch, in accordance with at least some embodiments of the present disclosure.

DETAILED DESCRIPTION

Figure 1:
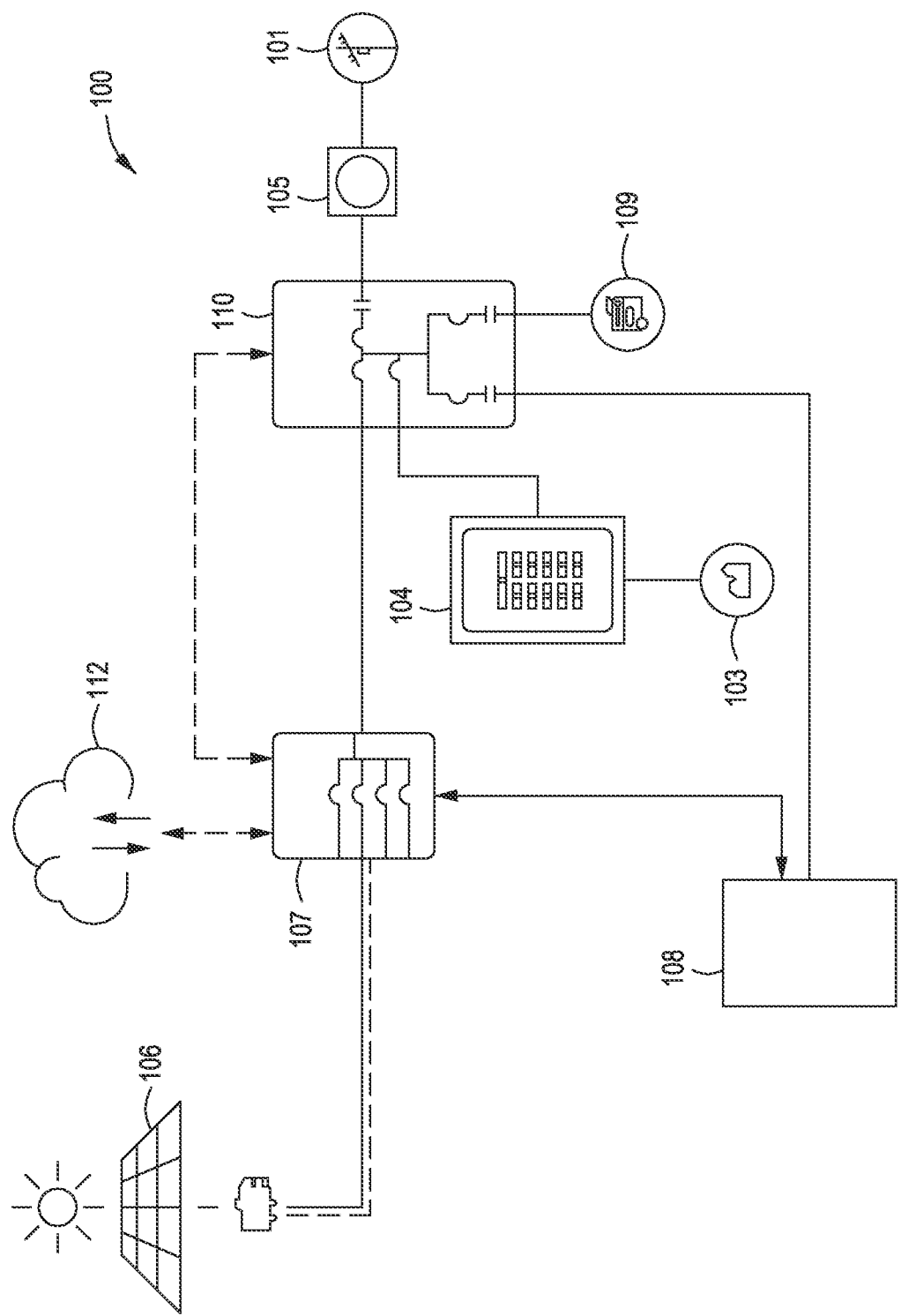
FIG. 1 is a diagram of a backup configuration supported by an energy management system, in accordance with at least some embodiments of the present disclosure.

In accordance with the present disclosure, an energy management system provides an innovative solution to the man panel upgrade (MPU) by connecting additional PVs and storage system(s) to a smart switch (microgrid interconnect device (MID)), e.g., as opposed to the main panel, thus avoiding the MPU for whole home and subpanel backup systems. With respect to whole home backup, the smart switch is connected between the utility meter and the main panel with an over current protection device that limits the amount of current that can flow to the main panel, thus avoiding the MPU. For the subpanel backup, an installer can move as much load circuits from the main panel to the sub-panel.

All the breakers inside a smart switch of the energy management system are configured to be opened to de-energize the entire energy management system, e.g., the energy management system will shut down.

The load circuits that will be backed up during grid outages are pre-selected during installation of the energy management system. If users choose to have subpanel backup, the users can select which circuits they want to backup during installation of the energy management system. In this case, only selected load circuits will be backed-up and other non-essential loads will not be powered-on during outages. In such an instance, there is no need to manually open the breakers if a user (e.g., homeowner) selects subpanel backup option.

If a user chooses the whole home backup option, then all the circuits of a house will be backed-up. If a user wishes to restrict backed-up circuits during outages, the user may need to not use those specific appliances or open the breakers of the specific circuits manually.

In at least some embodiments, the energy management system can be configured for three phase applications. In at least some embodiments, a generator including hardware and software capability can be integrated into the energy management system.

When the energy management system is configured as a backup system, disconnecting the energy management system from the grid does not turn off the power to a house (e.g., residence or premise), e.g., since the energy management system provides power to the home during an outage. For example, a single-phase AC-coupled battery (SP battery) and a three-phase AC-coupled battery (3P battery) are the grid-forming elements of the energy management system and can be isolated from the energy management system or shut down to de-energize the premises.

In at least some embodiments, at least four 3P batteries or twelve SP batteries (e.g., adding up to 40 kWh) can be connected to the smart switch. Additionally, up to two 3P batteries can be daisy chained and connected directly to the smart switch. For more batteries, an external sub panel may be used to combine the circuits and connect them to smart switch.

A storage system configured for use with an energy management system, such as the ENSEMBLE® energy management system available from ENPHASE®, is described herein.

FIG. 1 is a diagram of a backup configuration supported by an energy management system 100, in accordance with at least some embodiments of the present disclosure. The energy management system 100 is compatible with one or more microinverters, both for existing and new installs. The energy management system 100 can be configured for use with backward compatibility with M- or S-Series microinverter systems. In at least some embodiments, the energy management system 100 can be configured to provide a per-panel monitoring feature and real-time monitoring feature.

The energy management system 100 can be provided as a kit. For example, for grid-tied PV only, for grid-tied PV and storage, and/or for a grid-agnostic energy management systems, one or more of the PVs, the SP battery, the 3P battery, the smart switch, the combiner/gateway, Q cable and/or Q accessories can be provided in the kit. Additionally, two main breakers for a supply side and a load side connection of the smart switch, and circuit breakers for connection of PVs and storage systems can also be provided in the kit.

Continuing with FIG. 1, in at least some embodiments, the energy management system 100 comprises a storage system 108, a smart switch 110 (e.g., transfer switch), a combiner 107 including a wireless adaptor, which can be a USB dongle that connects to a communication gateway, one or more photovoltaics (PVs) 106, and a tertiary control 112 (e.g., cloud-based tertiary control using application programming interface (API)), which can provide over-the-air firmware upgrade. The combiner 107 can connect/communicate with the smart switch 110 and the storage system 108 via a wireless connection (or wired connection, such as an AC power wire) and with the Internet and/or cloud via Wi-Fi or cellular connections. For example, the combiner 107 comprises the communication gateway (FIG. 12) to which the wireless adaptor connects and communicates with the smart switch 110, the storage system 108, and the Internet and/or cloud. The combiner 107 connects to the PVs 106 and can communicate with the PVs 106 via a power line communication (PLC) over an AC power wire, and the other components of the energy management system 100 can connect to each other via the AC power wire. A combiner that is suitable for use with the energy management system 100 is the IQ® line of combiners available from Enphase Energy, Inc., from Petaluma, California.

In at least some embodiments, the energy management system 100 of FIG. 1 can be configured as a whole home backup (or partial home backup and subpanel backup) with the smart switch 110 of the energy management system 100 located at a service entrance (e.g., connected to a meter 105 which is connected to a utility grid 101). A user can back up a main load panel 104 (e.g., Siemens MC3010B1200SECW or MC1224B1125SEC, GE 200 Amp 20/40, and the like), which connects to one or more loads 103 (e.g., critical or backup loads). In such an embodiment, the smart switch 110 can support up to an 80 A breaker for the PVs 106 connected to the combiner 107 (e.g., PV combiner, (solar)) and an 80 A breaker for a battery storage circuit (e.g., for the storage system 108). When an existing combiner 107 is connected to the main load panel 104, a user can keep the combiner 107 connected to the main load panel 104, connect only the storage system 108 to the smart switch 110, and the space in the smart switch 110 for the combiner 107 can be left vacant and used for additional battery storage.

The storage system 108 is part of the energy management system 100 and is configured to participate in grid services, such as capacity and demand response. The storage system 108 is durable NEMA type 3R outdoor rated. The storage system 108 is configured as a modular AC-coupled battery storage system with time-of-use (ToU) and backup capability, which allows for easy installation.

The storage system 108 connects to the smart switch 110 and the combiner 107 and is configured to provide backup power when installed in a home or at a site. The storage system 108 includes one or more of a SP battery (120V) or a 3P battery (240V) (e.g., three SP batteries connected to each other, hereinafter 3P battery), which include corresponding internal microinverters, that are connected to (or integrated with) the PVs 106. The storage system 108 can be configured to detect when it is optimal to charge or discharge the SP battery and/or the 3P battery so that energy can be stored therein when energy is abundant and used when scarce.

The storage system 108 is configured to self-protect against low state of charge (e.g., <1%) of battery packs, or cell voltages remaining in extreme low warning region. For example, the storage system 108 is configured to shut down an AC bus and/or DC bus to prevent cell discharge of the SP battery and/or the 3P battery when required.

Additionally, the storage system 108 is configured to send notification alerts via, for example, the combiner 107 to a user. The notification, for example, can be suitable text indicating that the state of charge of the cells of the SP battery or the 3P battery are low, e.g., very low state of charge of the battery cells. Other text can also be used to alert a user. The alerts can also be available to a user and/or a technician or customer service representative to enable proactive appropriate preventive measures to avoid damage to the SP battery and/or the 3P battery. Moreover, the storage system 108 includes suitable energy reserve to self-protect against extremely low state of charge of battery cells of the SP battery and/or the 3P battery due to self-discharge losses of the storage system, e.g., for at least seven days after a notification is sent to a user, technician, and/or customer service representative. In at least some embodiments, the storage system 108 is configured to allow a user to set a remaining state of charge for each day.

Figure 2:
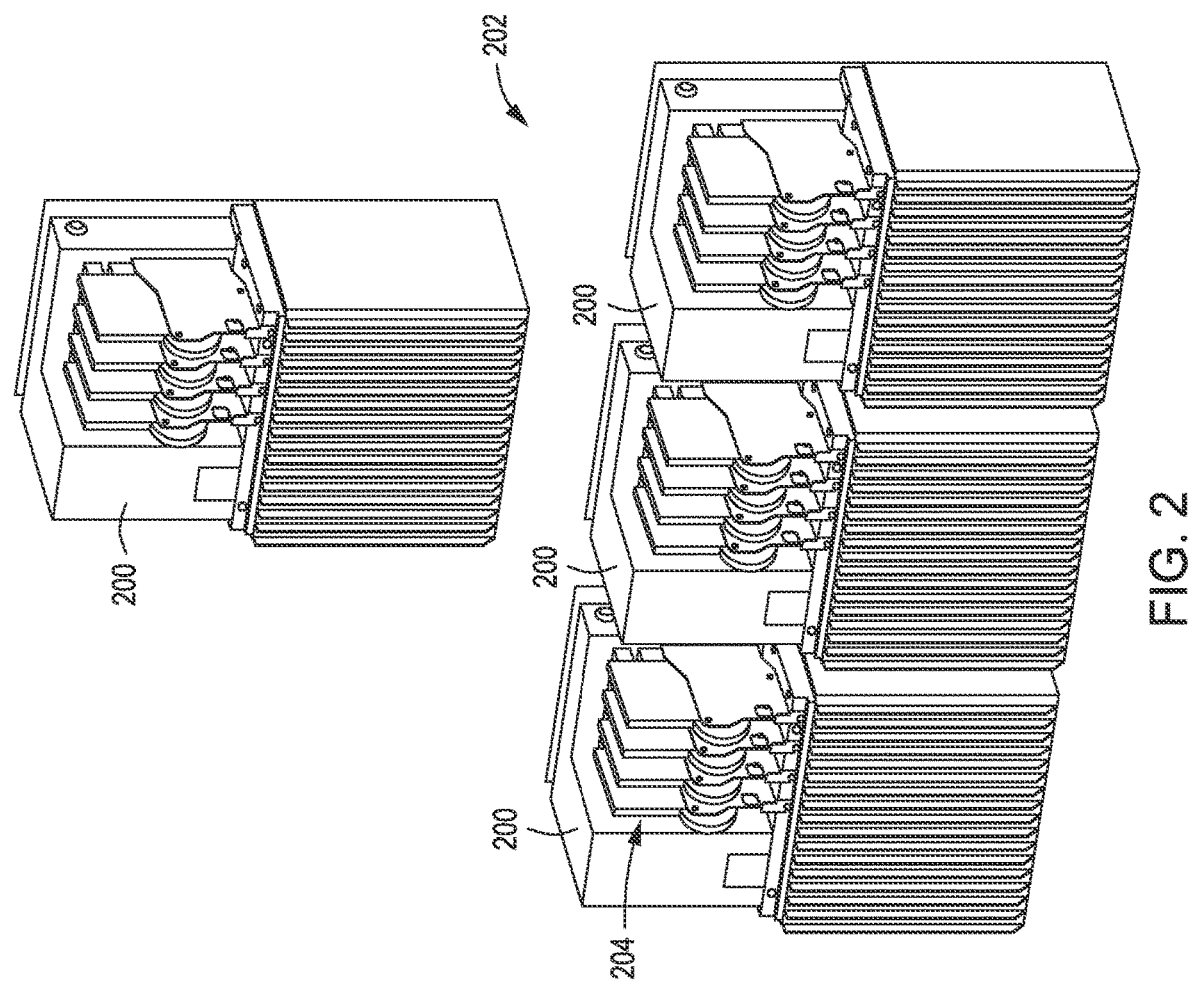
FIG. 2 is a perspective view of a single-phase AC-coupled battery (SP) and a three-phase AC-coupled battery (3P battery) of the energy management system, in accordance with at least some embodiments of the present disclosure.

FIG. 2 is a diagram of a backside of a SP battery 200 and a 3P battery 202, respectively, in accordance with at least some embodiments of the present disclosure. In at least some embodiments, the SP battery 200 and 3P battery 202 are lithium-ion batteries, such as lithium ferrous phosphate (LFP) batteries, can be configured for passive cooling, can be configured for either indoor and/or outdoor installations, can be configured for wireless communication (e.g., Zigbee, Wi-Fi, Bluetooth, or the like, as described in greater detail below) and can be configured with modular and expandable power and energy rating. The passive cooling feature eliminates the presence of any moving parts (e.g., mechanical fans, coolants, etc.), thereby making the storage system 108 less prone to failures.

The SP battery 200 and 3P battery 202 can be AC-coupled or integrated with the microinverters and can support backup operation and black start. The SP battery 200 has 3.36 kWh capacity and 1.28 kVA rated continuous output power. The 3P battery 202 comprises three SP batteries 200 and has 10.08 kWh and 3.84 kVA rated continuous output power. The modularity allows a user to install as many of the SP battery 200 or 3P battery 202 after an initial install of the energy management system 100, thus allowing the energy management system 100 to function seamlessly.

The SP battery 200 is configured to connect to one or a plurality of microinverters. For example, in at least some embodiments, the SP battery 200 is configured to connect up to four microinverters 204 which connect to one or more battery cell core pack of the SP battery and which form the grid in a user's house (e.g., a local grid) when a utility grid goes down. Likewise, the 3P battery 202, which is three SP batteries 200, is configured to connect to up to 12 microinverters which also connect to one or more battery cell core pack of the 3P battery and which form the grid in a user's house (e.g., a local grid) when a utility grid goes down. In at least some embodiments, the microinverters 204 are field swappable for both the SP battery 200 and/or the 3P battery 202. That is, the microinverters 204 configured for use with the SP battery 200 are also configured for use with the 3P battery 202. Additionally, in at least some embodiments, the battery cell packs (not shown) for the SP battery 200 are not swappable or configured for use with the 3P battery 202, and vice versa. Alternatively, the battery cell packs for the SP battery 200 can be configured for use with the 3P battery 202, and vice versa. Similarly, a battery controller 113 (FIG. 1), a battery management unit (BMU), and/or AC interface boards (all not shown) are not swappable or configured for use with the 3P battery 202, and vice versa, but in at least some embodiments, they can be.

The SP battery 200 and the 3P battery 202 are configured to respond to a commanded charge or discharge at a given C-rate (e.g., a charge/discharge rate), and accept or receive a predefined hourly, daily, and monthly schedule for charge and discharge at different C-rates. If one microinverter in either of the SP battery 200 or the 3P battery 202 fails (the energy management system 100 has a DPPM value of less-than-1000), the storage system 108 will continue to operate and provide backup with the remaining microinverters; a faulty microinverter can easily be replaced. Additionally, in the 3P battery 202 with 10.08 kWh usable energy capacity, if one 3.36 kWh SP battery 200 fails, the storage system 108 will continue to operate and provide backup power with its remaining base units.

The SP battery 200 can be used for PV self-consumption, PV non-export, and other grid-tied applications. The SP battery 200 can also be used to augment the 3P battery 202 units in a backup system and provide as many SP batteries required for pairing with PVs beyond the 3P battery limits. Each SP battery 200 can be used to enable backup with relatively small PV systems e.g., of less than 1.9 kWac in size. More SP batteries or 3P batteries can be added for larger PV systems sizes. Up to 1.9 kWac of PV can be supported for backup using each SP battery 200. Up to 5.7 kWac PV can be paired with one 3P battery 202 for backup. Additional batteries can be installed if size of the paired PV is more than this value.

In addition to the above, the storage system 108 provides backup (Off-grid) capability, e.g., using the SP battery 200 or the 3P battery 202, support backup with seamless transfer (e.g., <100 ms), and provides compatibility with PV module installations. For example, the storage system 108 can be configured for use with new PV installs, retrofits, whole house backup operation up to 200 A, sub-panel backup operation up to 200 A, grid-tied operation: ToU, self-consumption, and/or daily cycling, and standalone installation without PV modules.

Figure 3:
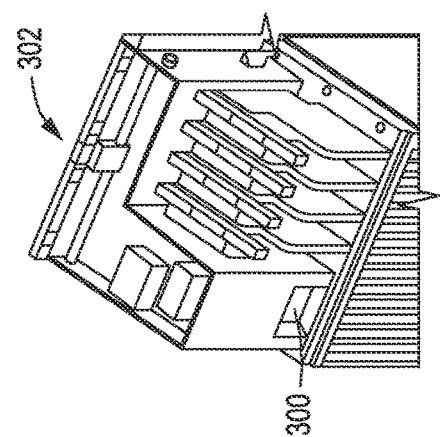
FIG. 3 is partial, perspective view of the SP battery including an integrated DC disconnect switch, in accordance with at least some embodiments of the present disclosure.

FIG. 3 is partial, perspective view of the SP battery 200 including an integrated DC disconnect switch 300, which is configured for use with either the SP battery 200 or the 3P battery 202 configuration. In at least some embodiments, during mounting of the SP battery 200 and/or the 3P battery 202, the DC disconnect switch 300 can be in a locked or off configuration to prevent electrical shock, and after the SP battery 200 and/or the 3P battery 202 are installed, the DC disconnect switch 300 can be moved to the unlocked or on configuration.

FIGS. 4A and 4B are front and perspective views of a wall-mount bracket 400 for the SP battery. FIGS. 5A and 5B are front and perspective views of a wall-mount bracket 500 for the 3P battery. To mount the SP battery 200 or the 3P battery 202, a user can place them right side up on a flat mounting surface. In at least some embodiments, the SP battery 200 and the 3P battery 202 can be located closest to a main power supply. Next, a user, while supporting the SP battery 200 or the 3P battery 202 from underneath, can lift the SP battery 200 or the 3P battery 202 and hold them at an angle so that a top of the SP battery 200 or the 3P battery 202 sets into a top of a respective the wall-mount bracket 400, 500. Once the top of the SP battery 200 or the 3P battery 202 is engaged with top tabs 402, 502 of the wall-mount bracket 400 and wall-mount bracket 500, a user can maintain the battery relatively vertical, to ensure the SP battery 200 or the 3P battery 202 is flush against their respective wall mount bracket and can lower the SP battery 200 or the 3P battery 202 down until fully seated on a respective wall-mount bracket shelf 404, 504. Next, a user can attach the SP battery 200 or the 3P battery 202 to the mounting bracket by aligning a screw hole 302 (FIG. 3) at a top of the SP battery 200 or the 3P battery 202 with a corresponding screw hole 406, 506 at the top of the wall-mount bracket 400 and wall-mount bracket 500. In at least some embodiments, a plurality of mounting apertures 408, 508 can be provided on the wall-mount bracket 400 and wall-mount bracket 500 for securing the wall-mount bracket 400 and wall-mount bracket 500 to a mounting surface.

FIG. 6 is a perspective view of one type of a raceway 600 that may be used when installing the 3P battery 202 (e.g., three SP batteries 200), in accordance with at least some embodiments of the present disclosure. FIG. 7 is diagram of the raceway 600 shown installed on adjacent SP batteries, in accordance with at least some embodiments of the present disclosure. When installing the 3P battery 202, one or more raceways 600 may be used. For example, to install the raceway 600, a user can face the front of the 3P battery 202 (e.g., fronts of three SP batteries 200), and insert the raceway 600 through the right-hand unit's left-side conduit opening 700 (see FIG. 8, for example) from within a field wiring compartment 702, with the arm 602 of the raceway 600 pointing up. Next, a user can push a body 604 of the raceway 600 through the left-side conduit opening 700 and into the left-side unit's right-side conduit opening 704 (not explicitly shown) of adjacent ones of three SP batteries 200 until one or more snap features 606 (e.g., such as a pair of snap features, one shown) on the raceway 600 engage the left-side unit's enclosure. Once fully inserted, a user can rotate the arm 602 (e.g., toward a user or downward) until the arm 602 stops. In at least some embodiments, the arm 602 can include a c-shaped notch 610 that is configured to engage a corresponding protrusion (not shown) to lock the arm 602 in a fixed or locked configuration. The left-side conduit opening 700 of each of the three SP batteries 202 has a flat surface, without additional features. A relatively large seal on the raceway 600 is configured to mate with the left-side conduit opening 700. A pair of O-rings 608 are disposed between the arm 602 and the snap features 606. For example, the right-side conduit opening 704 has a groove around the hole to fit the O-ring 608 of the raceway 600 and the left-side conduit opening 700 has a groove around the hole to fit the other O-ring 608 of the raceway 600. The O-rings 608 are captured in the grooves between the 3P battery 202 enclosure and the raceway 600 flanges 612 adjacent to the O-rings 608 (see FIG. 7, for example).

Figure 8:
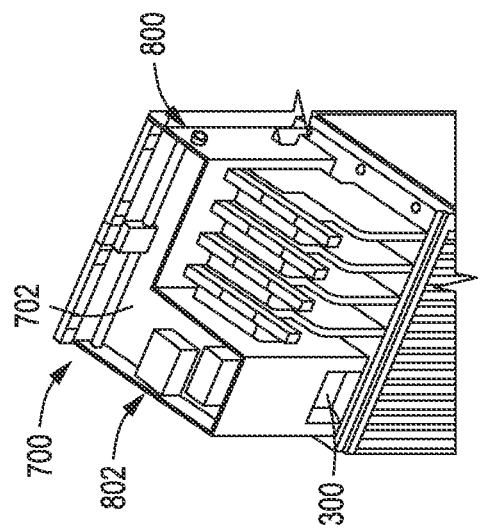
FIG. 8 is partial, perspective view of the SP battery, in accordance with at least some embodiments of the present disclosure.

FIG. 8 is partial, perspective view of the SP battery 200, in accordance with at least some embodiments of the present disclosure. Using conductors and one or more suitable conduits, a user can connect an AC disconnect (not shown) to the SP battery 200. A user can use a conduit opening 800 to connect the conduit and pass the wires through them. In certain embodiments, if the smart switch 110 is in line-of-sight, a breaker can serve as the AC disconnect. Next, a user can connect each of the wires in a terminal block 802 in the field wiring compartment 702 to their corresponding conductor (e.g., lines and ground); each terminal accepts two 12-8 AWG conductors (11 mm/7/16 inch strip length), and can tighten to 14 in lb. If installing the 3P battery 202, wires can be routed from an SP battery 200 to an adjacent SP battery 200 through the raceway 600. There are two positions for each line and for ground in the terminal block 802 to allow for daisy-chaining. If additional SP batteries or 3P batteries need to be connected, a user can use additional conduit and an additional set of wires to connect between field wiring compartments.

Figure 9:
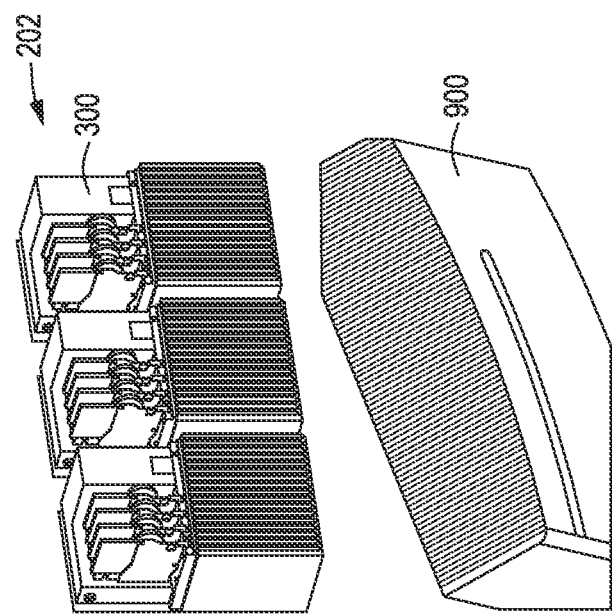
FIG. 9 is a perspective view of the 3P battery without a cover and with the cover installed, in accordance with at least some embodiments of the present disclosure.

FIG. 9 is a perspective view of the 3P battery 202 without a cover 900 and with the cover 900 (enclosure) installed, in accordance with at least some embodiments of the present disclosure. A user can place the cover 900 over the 3P battery 202 (e.g., three SP batteries) and slide the cover 900 over the 3P battery 202 so that interior guides (not shown) of the cover 900 slide easily over the guides (not shown) on the 3P battery 202. Next, the user can check that the screw hole on top of the cover 900 aligns with a corresponding screw hole (e.g., screw hole 302) on the 3P battery, and can connect the cover to the 3P battery using one or more suitable screws. Similar processes can be used for connecting a cover to the SP battery 200.

Figure 10:
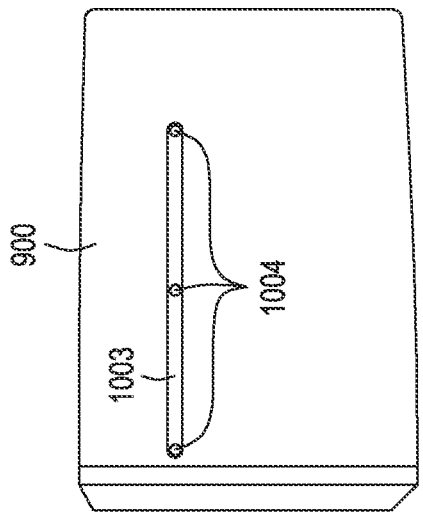
FIG. 10 is a diagram of the SP battery and the 3P battery with respective coverings, in accordance with at least some embodiments of the present disclosure.

FIG. 10 is a diagram of the SP battery 200 and the 3P battery 202 with cover 1000 and cover 900, in accordance with at least some embodiments of the present disclosure. The SP battery 200 and the 3P battery 202 are shown in a fully assembled configuration including covering 1000 (e.g., a first covering), 900 (e.g., a second covering), respectively, configured to maintain NEM integrity. As noted above, the SP battery 200 can be configured for 3.36 kWh/1.28 kW operation, and with the covering 1000 can weigh about 45.3 kg (100 lbs.) and can have dimensions of about 26.1"×14.4"×12.5" (H×L×D). As noted above, the 3P battery 202 can be configured for 10.08 kWh/3.84 kW operation, and with the covering 1002 can weigh about 3×45.3 kg (136 kg, 300 lbs.), and can have dimensions of about 26.1x"×42.1"×12.5" (H×L×D).

In at least some embodiments, an LED display 1003 or a plurality of LEDs 1004, or other suitable device, can be located in manner that is visible to a user or technician. For example, the LED display 1003 and the plurality of LEDs 1004 can be located to be visible through a front surface of the cover 900 and cover 1000 (see FIG. 10, for example). In at least some embodiments, each of the LED display 1003 and the plurality of LEDs 1004 are configured to display configured to display information. For example, in at least some embodiments, the LED display 1003 and the plurality of LEDs 1004 are configured to display performance information, cell information of the single-phase AC coupled battery and the three-phase AC coupled battery, microinverter status information, guidance to a technician, e.g., for debugging, and a status information of the single-phase AC coupled battery and the three-phase AC coupled battery including battery failure, microinverter failure, or firmware upgrade. In at least some embodiments, instructions to decode LED signaling can be provided in, for example, a technical manual, and present the process flow and status.

For example, after the cover 1000 is connected to the SP battery 200 and/or the cover 900 to the 3P battery 202, and the storage system 108 of the energy management system 100 is powered on (e.g., a startup process) the LEDs 1004 can be configured to flash one or more suitable colors, e.g., yellow, red, green, and the like, for a duration of a startup process. In at least some embodiments, the storage system 108 can be configured such that LEDs not flashing the one or more of the colors during the startup can be indicative of a malfunction. After the SP battery 200 and 3P battery 202 are powered on and a gateway has detected the SP battery 200 and 3P battery 202, the LEDs 1004 can be configured as follows. In at least some embodiments, the LEDs 1004 can flash yellow (or other suitable color) while each of the SP battery 200 and 3P battery 202 boots up. In at least some embodiments, if the LEDs 1004 rapidly flash green (or other suitable color) for more than two minutes (or other suitable time frame), this can be indicative of the SP battery 200 and 3P battery 202 being in a trickle charge mode and will remain so until the SP battery 200 and 3P battery 203 reach a minimum state of charge (e.g., up to 30 minutes or other suitable time frame). After the SP battery 200 and 3P battery 202 are booted up, the LEDs 1004 can be configured to become blue or green (or other suitable color) depending on the charge level. If the LEDs 1004 flash yellow (or other suitable color) after one hour (or other suitable time frame) or changes to a flashing red state (or other suitable color), this can be indicative of a malfunction. Table 1 is an example of various LED operations suitable for use with the storage system 108.

TABLE 1

| State | Description |
| --- | --- |
| Rapidly flashing yellow | Starting up/Establishing communication |
| Red flashes in sequence of 2 | Error. See "Troubleshooting |
| Solid yellow | Not operating due to high temperature. See "Trouble shooting" |
| Solid blue or green | Idle. Color transitions from blue to green |
| Slowly flashing blue | Discharging |
| Slowly flashing green | Charging |
| Slowly flashing yellow | Sleep mode activate |
| Off | Not operating. See "Troubleshooting |

The microinverters 204 are configured to communicate via power line communication (PLC). For example, the PLC is configured for internal communication between the battery controller 113 of the storage system 108 and the microinverters 204 inside each of the SP battery 200 and 3P battery 202. Additionally, the battery controller 113 of the storage system 108 including each of the SP battery 200 or 3P battery 202 is configured to support wireless communications to communicate with, for example, a gateway, e.g., 2.4 GHz and 900 MHz. The wireless communication interface can be over IEEE 802.15.4 running on ZigBee (MODBUS or SEP2.0 running over ZigBee), or other suitable wireless communication interface, e.g., Wi-Fi, Bluetooth, and the like. In at least some embodiments, the SP battery 200 or 3P battery 202 can be configured to communicate over one or more higher-level protocols running on top of Zigbee. The SP battery 200 or 3P battery 202 are configured for updating to new protocols with a software upgrade. All software and firmware components included in the storage system 108 are upgradable remotely, e.g., without a need for a user to download from the server. The battery controller 113 is configured to translate/limit/aggregate messages received from the microinverters 204 prior to sending traffic to the gateway, e.g., translates messages between the gateway and the PVs 106 and sends selected messages appropriate from each side. For example, the battery controller 113 of the storage system 108 is configured to select (use) a plurality of pre-defined parameters (and/or events) to communicate with the gateway.

The storage system 108 including the SP battery 200 or 3P battery 202 are configured to support existing grid tied operation modes and features and support functions, in both grid-tied and off-grid modes, including, but not limited to, self-consumption in grid-tied mode, ToU optimization in grid-tied mode, demand charge reduction in grid-tied mode, demand management in grid-tied mode, and/or range extension in off-grid mode.

The smallest AC power supply can be about 3.36 kWh, and since the storage system 108 is modular and expandable, a user can install as many storage systems 108 as required to power the appliances that a user wants to, with a maximum of twelve SP batteries 200 or four 3P batteries 202. The energy management system 100 enables a user to back up a home entirely or partially, up to a rated energy capacity of 40 kWh and more than 15 kW power rating, providing the maximum flexibility to a user.

The storage system 108 includes a remote monitoring system. For example, in at least some embodiments, the storage system 108 includes a cloud interface or other server-based system (e.g., tertiary control 112) that is configured to transmit notification alerts for extremely low state of charge (e.g., <0.5%) of the SP battery 200 and/or the 3P battery 202. The remote monitoring system is configured to provide a state-of-charge estimation based on a self-discharge rate of the storage system 108, and information from the storage system 108 to enable sending notifications, e.g., such as when the storage system is not communicating via a combiner/gateway. The energy management system 100 and components thereof use industry standard encrypted messaging and authentication to communicate with one another, and with the cloud interface.

Figure 11:
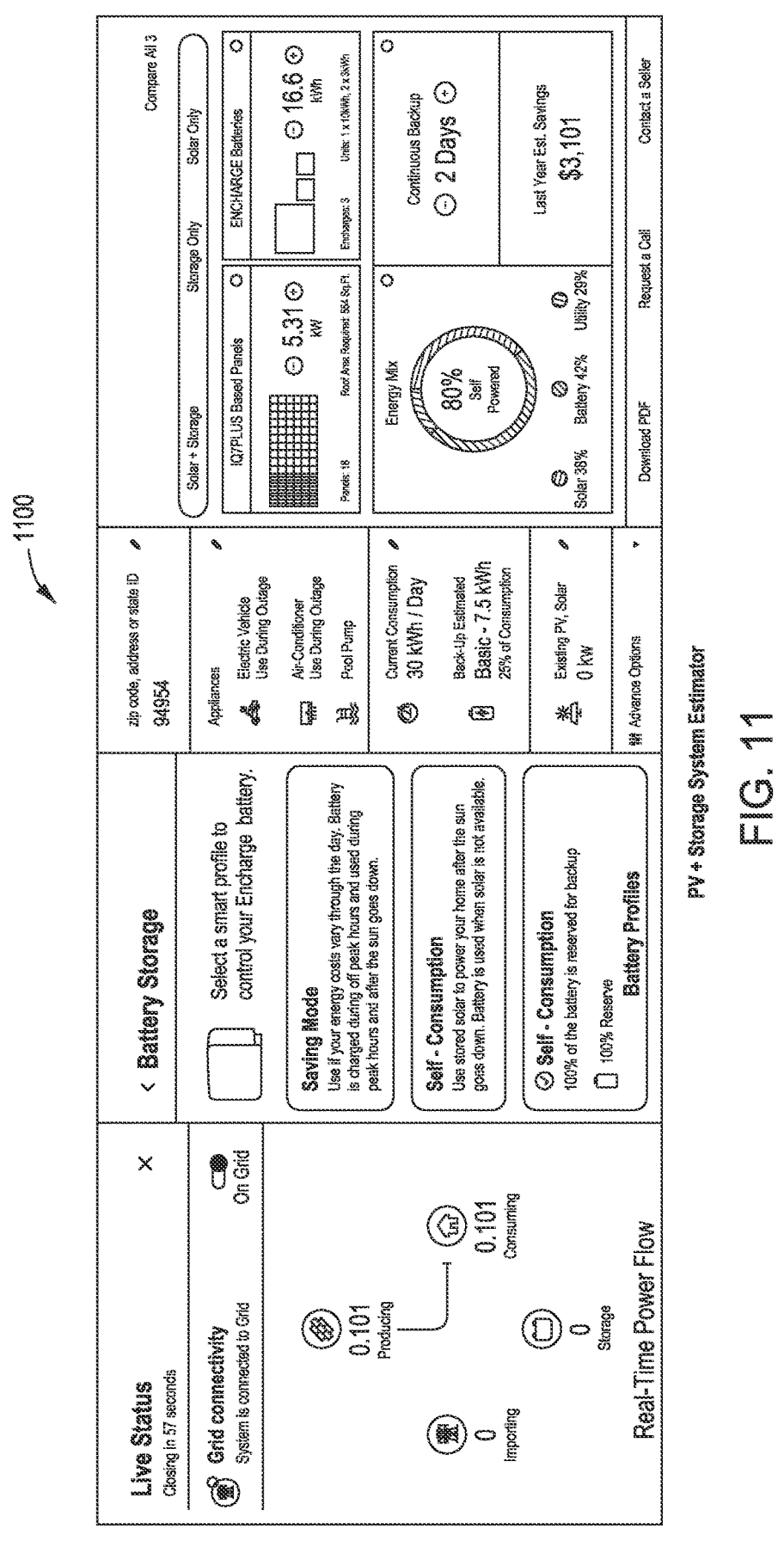

FIG. 11 is a diagram of a screen shot 1100 of a cloud interface (e.g., tertiary control 112) for use with the energy management system 100, in accordance with at least some embodiments of the present disclosure. As illustrated by the screen shot 1100, the cloud interface of the remote monitoring system provides real-time power flow with local grid connectivity status and control, provides configurable single-phase AC coupled battery and three-phase AC coupled battery profiles to optimize at least one of self-consumption or time-of-use, and provides a homeowner with an estimator tool for storage system sizing and photovoltaic sizing, or troubleshooting capabilities to identify and fix issues with the energy management system 100.

Figure 12:
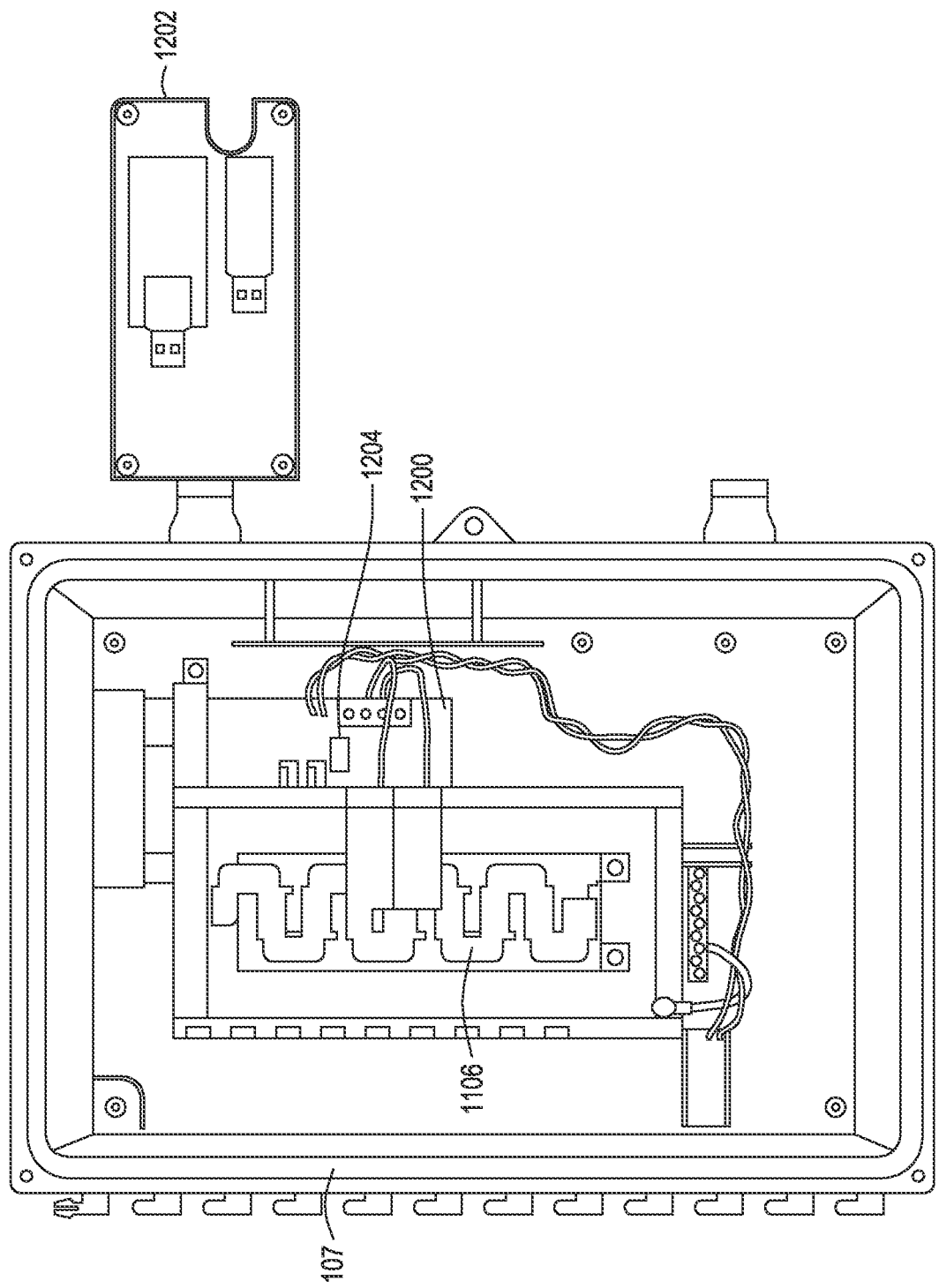
FIG. 12 is a diagram of a combiner including a gateway of the energy management system, in accordance with at least some embodiments of the present disclosure.

FIG. 12 is a diagram of the combiner 107 including a gateway 1200 and wireless communication kit 1202 (e.g., such as the ENSEMBLE® line of communication kits available from Enphase Energy, Inc., from Petaluma, California), in accordance with at least some embodiments of the present disclosure. The gateway 1200 is configured to measure PV production and home energy consumption. The gateway 1200 further comprises a gateway controller 1204 that is coupled to a bus and communicates with, for example, power conditioners (e.g., via PLCs) and/or other types of wired and/or wireless techniques (e.g., 2.4 GHz and 900 MHz), as described above. The gateway controller 1204 (and the battery controller 112) comprises a transceiver, support circuits, and a memory, each coupled to a CPU (not shown). The CPU may comprise one or more conventionally available microprocessors or microcontrollers; alternatively, the CPU may include one or more application specific integrated circuits (ASICs). The gateway controller 1204 may send command and control signals to one or more of the power conditioners and/or receive data (e.g., status information, performance data, and the like) from one or more of the power conditioners. In some embodiments, the gateway controller 1204 may be a gateway that is further coupled, by wireless and/or wired techniques, to a master controller via a communication network (e.g., the Internet) for communicating data to/receiving data from the master controller (e.g., performance information and the like). In at least some embodiments, the gateway controller 1204 can be configured to function as the battery controller 113 of the storage system 108.

The combiner 107 or the gateway 1200 is configured to support one or more circuits. For example, in at least some embodiments, gateway 1200 can support up to four circuits (e.g., for either solar and storage configurations) using, for example, one or more of busbars (e.g., Eaton busbar), breakers (e.g., BR breakers, 10 A gateway breaker, and the like).

The combiner 107 or the gateway 1200 provides the storage system with frequency and voltage values (e.g., droop control) as a guide to how much energy to charge and discharge from the SP battery 200 and 3P battery 202. For example, the gateway 1200 can send frequency (F) and voltage (V) values (bias) to the battery controller 113 of the storage system 108 to control the microinverters 204 in the SP battery 200 and/or the 3P battery 202. The F and V values are sent to the battery controller 113 for secondary control, which can occur over seconds, and the battery controller 113 can determine the charge and discharge power of the SP battery 200 and/or the 3P battery 202. Additionally, the PV modules are configured to measure their own F and V locally and control them during backup operation, e.g., in order of every few milliseconds.

The gateway 1200 is provided in an enclosure (e.g., a durable NEMA type 3R enclosure similar to the enclosure or coverings of the SP battery 200 or the 3P battery 202) that is configured for single stud mounting, which simplifies installation, accepts conduit entry along sides, bottom, and/or back of enclosure.

Figure 13:
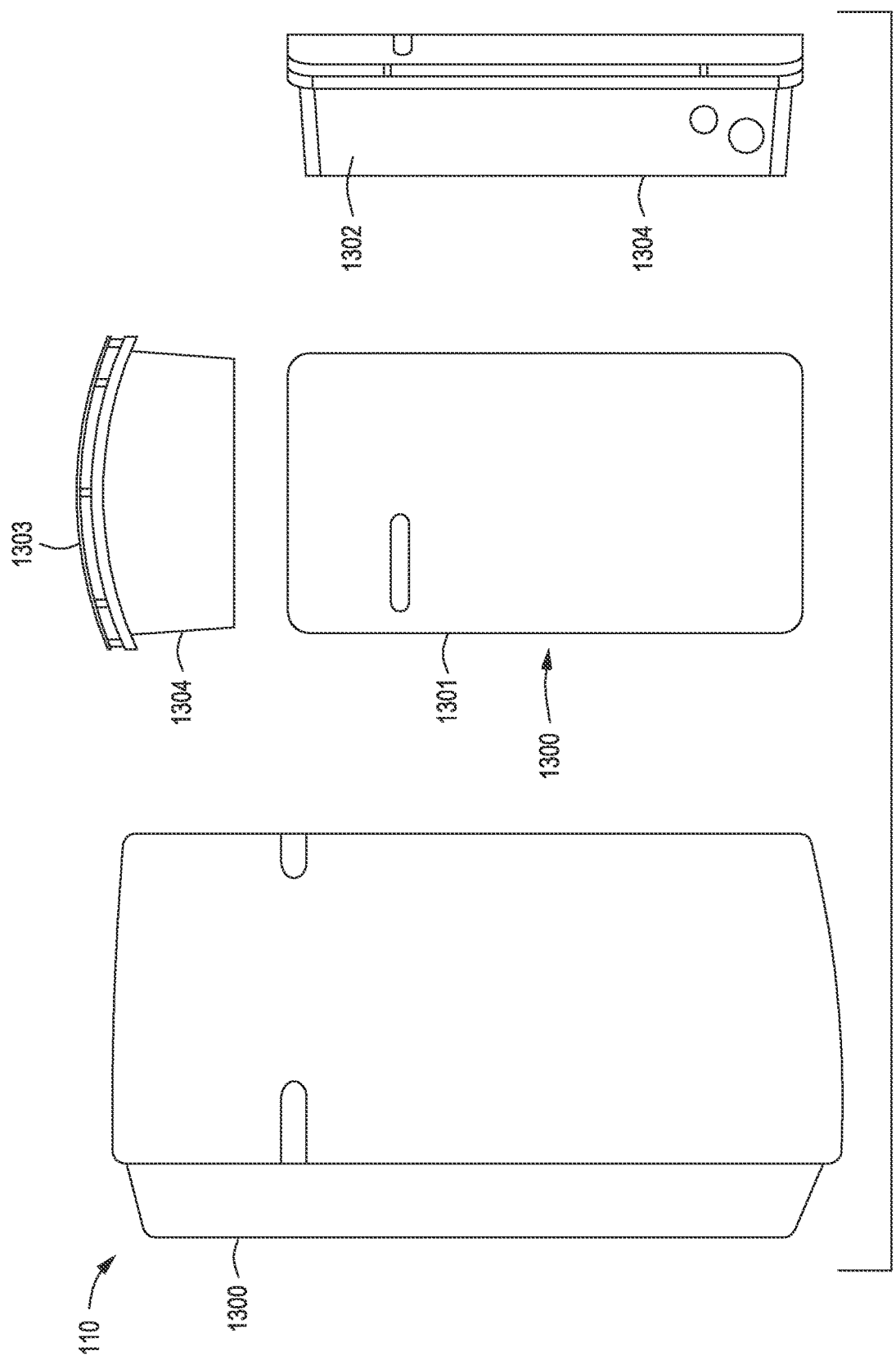
FIG. 13 is various views of a smart switch of the energy management system, in accordance with at least some embodiments of the present disclosure.

FIG. 13 illustrate various views of the smart switch 110, in accordance with at least some embodiments of the present disclosure. The smart switch 110 includes a reliable, durable NEMA type 3R enclosure. The smart switch 110 can comprise a housing 1300 with a front cover 1301 having a width of about 19.7 inches and a height of about 36 inches. The smart switch 110 can include a main enclosure 1302 having a width of about 18.8 inches, a height of about 33.8 inches, a depth of about 7.2 inches, and a distance between a back surface 1304 of the main enclosure 1302 to a front surface 1303 of the front cover 1301 is about 9.7 inches.

The smart switch 110 is configured to consolidate interconnection equipment into a single enclosure and streamline grid-independent capabilities of the PVs 106 and battery storage installations by providing a consistent, pre-wired solution for a user (e.g., residential users). Along with the smart switch 110 functions, the smart switch 110 also includes PV 106, storage system 108, and generator 109 input circuits. The smart switch 110 includes an input that is configured to connect to one of the meter 105 at a service entrance or the main load panel 104.

A smart switch that is suitable for use with energy management system 100 can be the ENPOWER® line of smart switches available from Enphase Energy, Inc., from Petaluma, California. The smart switch 110 can be installed using a wall-mount bracket and can be installed complying with national and local electrical codes and standards, as described in greater detail below.

The smart switch 110 is a MID (e.g., as per NEC section 705) and can be configured for 100 A, 150 A or 200 A disconnecting current capacity for backup, and provides seamless transition to backup during utility grid outages. The smart switch 110 includes an auto transformer to support 120V/240V loads in backup, supports interconnection of the SP battery 200 and 3P battery 202, the combiner 107 (AC), and backup load panel. The smart switch 110 supports whole home and subpanel backup, and includes an enclosure for indoor and outdoor installations, can support 2.4 GHz and 900 MHz wireless communication, and supports generator integration.

The smart switch 110 is configured to provide safe control connectivity to the utility grid 101, automatically detect utility grid 101 outages, and provide seamless transition to backup. The smart switch 110 can connect to the one or more loads 103 or service entrance side of the main load panel 104 (FIG. 1), include centered mounting brackets to support mounting to one or more mounting surfaces, support conduit entry from the bottom, bottom left side, and/or bottom right side, support whole home, partial home backup, and subpanel backup, can provide up to 200 A main breaker support, and include a neutral-forming transformer for split phase 120/240V backup operation. The smart switch 110 streamlines grid-independent capabilities of PV 106 and storage system 108 installations.

FIG. 14 includes diagrams of a circuit breaker installation, lugs at a main breaker position, and a breaker installed at a main breaker position for the smart switch 110, in accordance with at least some embodiments of the present disclosure. The smart switch 110 includes a back surface 1400 that is configured to support the electrical components of the smart switch 110 and to expose a main breaker 1402 (e.g., 200 A). The main breaker 1402 is connected to a main lug housing 1404 that includes a connection area 1406 to which the main breaker 1402 is connected. The main lug housing 1404 is supported on the back surface 1400. The main breaker 1402 includes a switch 1408 and two electrical connection areas 1410 that are configured to receive corresponding wires (not shown). The smart switch 110 consolidates interconnection equipment into a single enclosure and streamlines grid-independent capabilities of the PVs 106 and storage installations by providing a consistent, pre-wired solution for users. In addition to the above-described functions, the smart switch 110 can be configured to include PV, storage system, and generator input circuits.

Figure 15C:
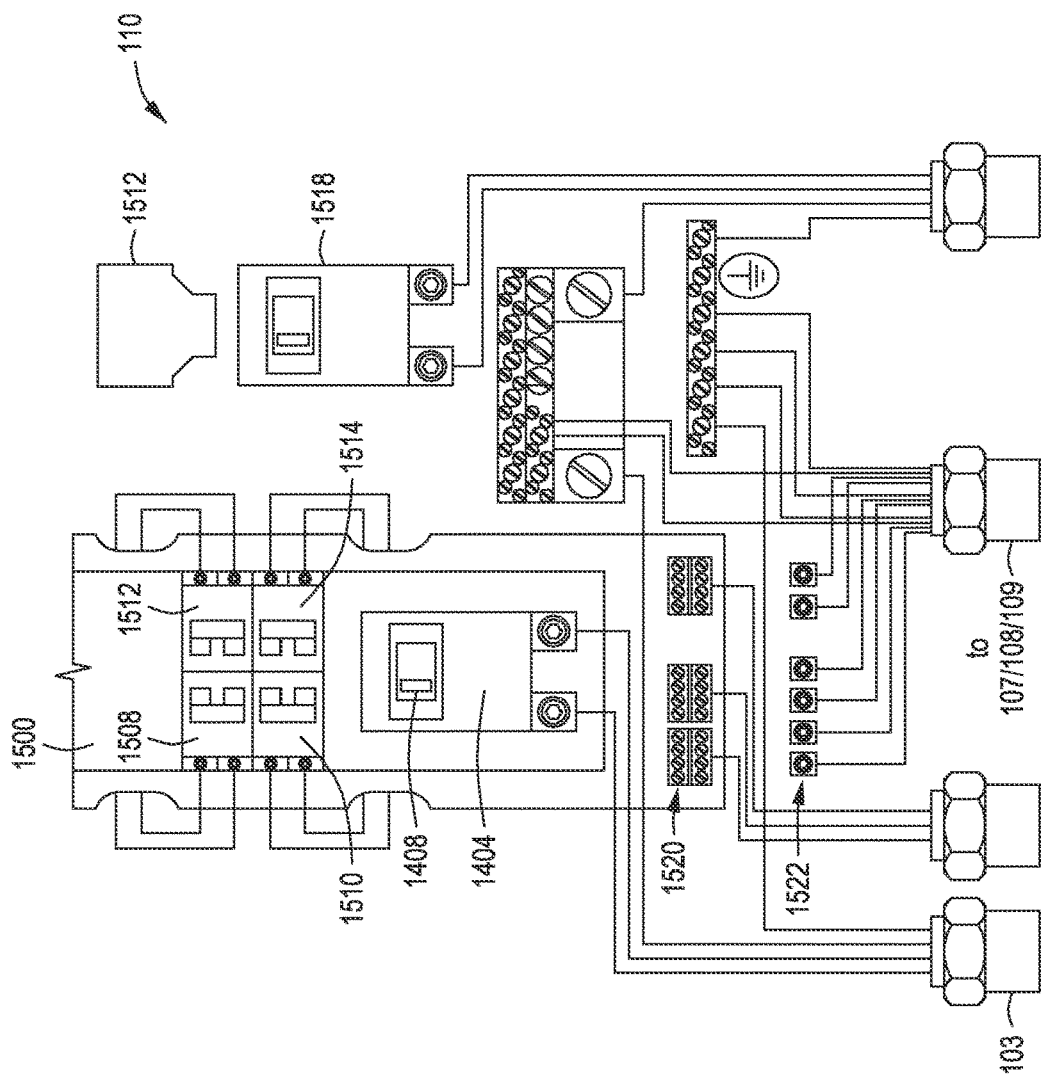
FIGS. 15A-15D are diagrams of an electrical panel including electrical details of the smart switch, in accordance with at least some embodiments of the present disclosure.
Figure 15A:
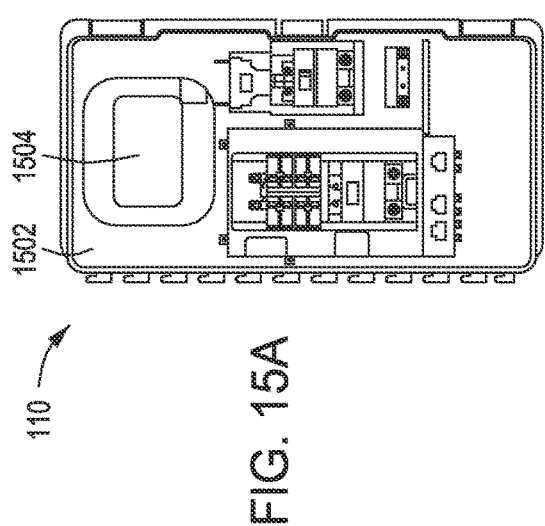
Figure 15B:
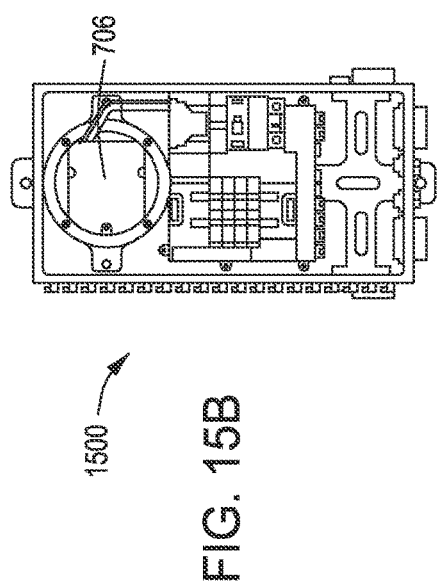
Figure 15D:
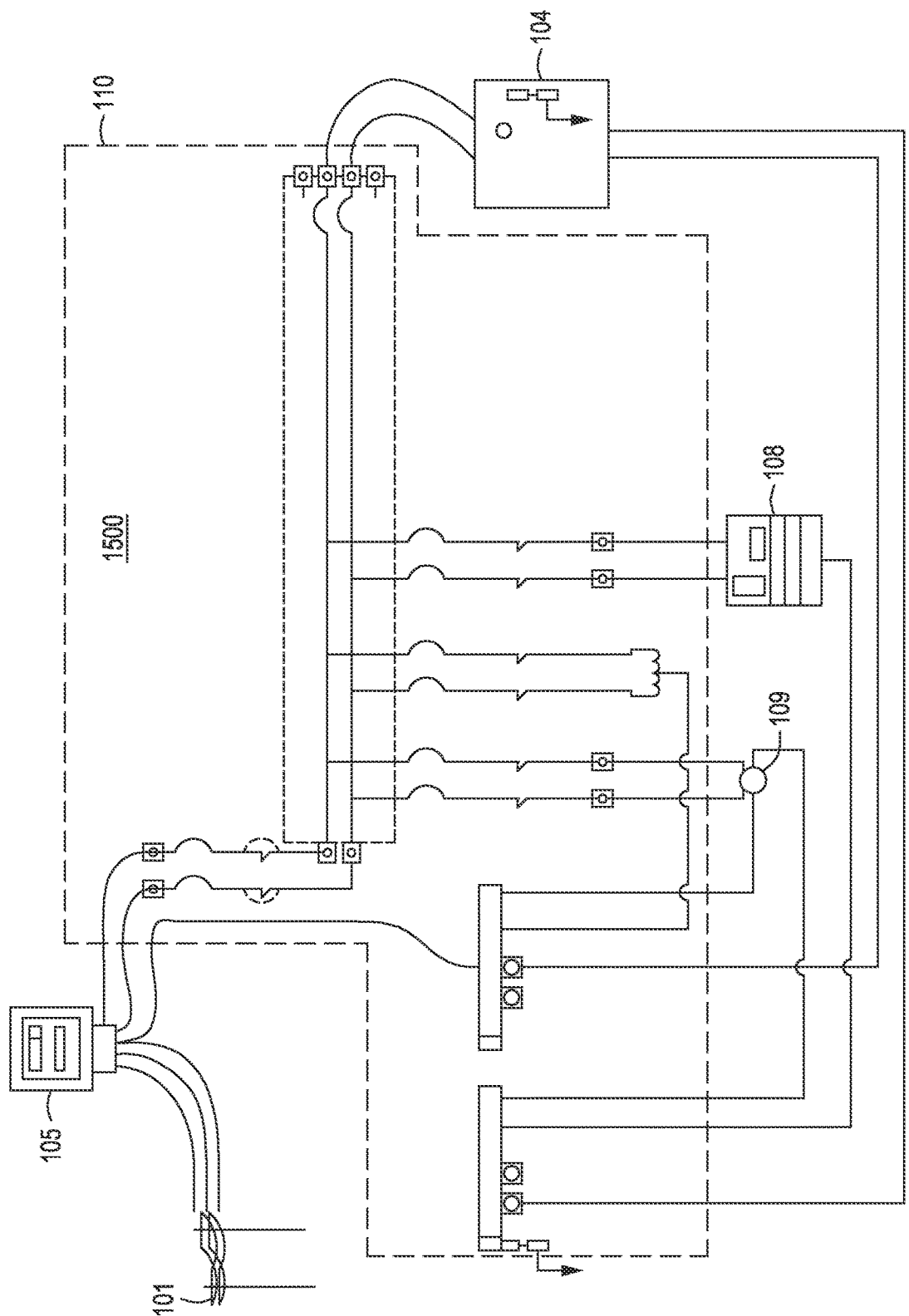

FIGS. 15A-15D are diagrams of an electrical panel 1500 including electrical details of the smart switch 110, in accordance with at least some embodiments of the present disclosure. FIG. 15A illustrates a back cover 1502 that partially covers the electrical panel 1500 of the smart switch 110. The back cover 1502 includes a door 1504 that covers the control PCBA 1506 (FIG. 15B) and autotransformer (not shown). The back cover 1502 includes an opening through which one or more breakers, Eaton breakers, relays, MID relays, connectors, bus bars, and other electrical components of the electrical panel 1500 extend (FIG. 15A). For example, the electrical panel 1500 can include an AC combiner breaker 1508, a battery storage system breaker 1510, an auto transformer breaker 1512, a generator breaker 1514, the main breaker 1402, a main relay, (e.g., 200 A), a main breaker 1518 for service disconnect, I/O connectors 1520, and one or more connectors 1522 for the combiner 107, storage system 108, and the generator 109 (FIGS. 15A and 15C). The wiring from the electrical panel 1500 can be fed from the smart switch 110 to the various components of the energy management system 100 (e.g., the combiner 107, the storage system 108, generator 109, etc.) or components connected to the energy management system 100, e.g., the main load panel 104, (FIG. 15D).

Figure 17:
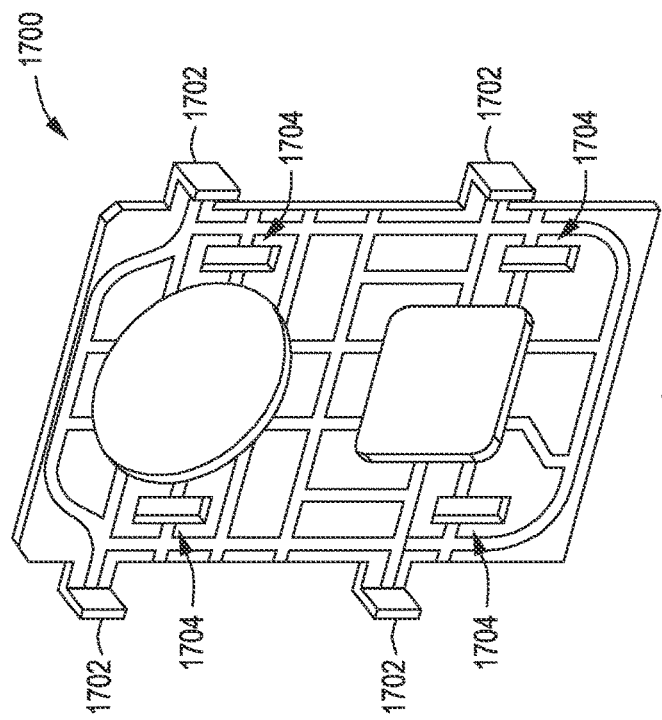
FIG. 17 is a diagram of a bracket, in accordance with at least some embodiments of the present disclosure.
Figure 18:
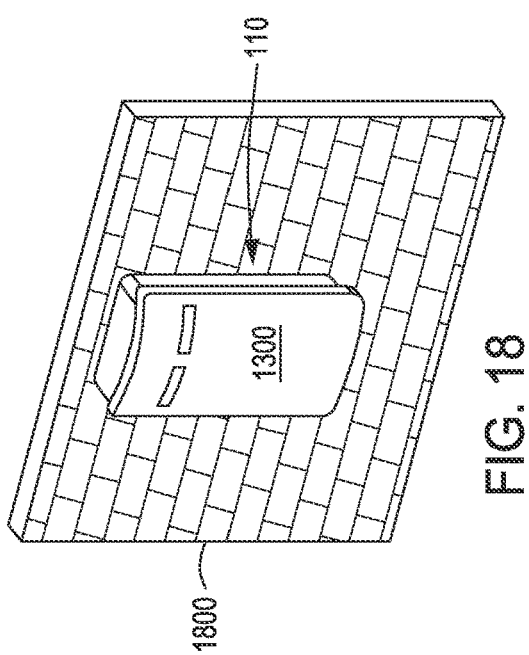
FIG. 18 is a diagram of the smart switch shown mounted on a mounting surface using the mount of FIG. 16 and bracket of FIG. 17, in accordance with at least some embodiments of the present disclosure.
Figure 16:
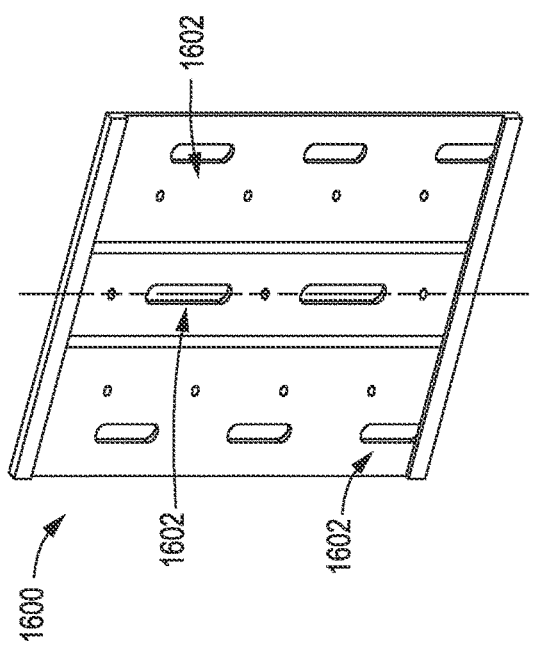
FIG. 16 is a diagram of a mount used for mounting the smart switch, in accordance with at least some embodiments of the present disclosure.

FIG. 16 is a diagram of a wall mount 1600 used for mounting the smart switch 110 of the energy management system 100, FIG. 17 is a diagram of a bracket 1700 of the smart switch 110, and FIG. 18 is a diagram of the smart switch 110 shown mounted on a mounting surface 1800, in accordance with at least some embodiments of the present disclosure. The wall mount 1600 includes a plurality of apertures 1602. The apertures 1602 are configured to receive one or more fasteners therethrough for mounting the wall mount 1600 to the mounting surface 1800. The bracket 1700 is configured to connect to a back of the smart switch 110 and to the wall mount 1600. For example, in at least some embodiments, the bracket 1700 includes locking tabs 1702 (e.g., generally L-shaped) that are configured to engage a side surface of the smart switch 110. During installation, a user aligns a plurality of apertures 1704 of the bracket 1700 with the plurality of apertures 1602 of the wall mount 1600 and drives the one or more fasteners (e.g., bolts, screws, etc., not shown) through the apertures 1602 and apertures 1704 and into the mounting surface 1800, e.g., single stud, wood, brick, or concrete wall, and the like. Next, a user can attach/connect the smart switch 110 to the bracket 1700 by pressing the smart switch 110 into the bracket 1700 until the locking tabs 1702 engage the side surface of the housing 1300 of the smart switch 110.

The smart switch 110 is configured to provide MID functionality that allows a home to be isolated from the grid, thus enabling the grid-independence function. The smart switch 110 is also configured to provide connections for easier integration of the storage system, PV modules, and generator integration into a user's home energy system. The smart switch 110 can also be configured for managing load imbalance in a user's home. For example, the smart switch 110 can include general purpose relays that can be used for actuating external devices, e.g., power contactors and relays to control loads and load subpanels, control heating and air conditioning thermostats, water heater, electric chargers, and other electric loads. In at least some embodiments, the smart switch 110 includes 2 normally open and 2 normally closed general purpose relays I/O, and one generator control relay I/O. The generator I/O can be used to remotely start and stop generators and other resources such as fuel cells and other power generation and storage devices.

A microgrid system can be defined as a premises wiring system that has generation, energy storage, and load(s), or any combination thereof, that includes the ability to disconnect from and parallel with a primary source. Such systems have also been referred to as intentionally islanded systems.

In accordance with the instant disclosure, the smart switch 110 can comply with the following: (1) be required for any connection between a microgrid system and a primary power source; (2) be listed or field labelled for the application; and (3) have sufficient number of overcurrent devices located to provide overcurrent protection from all sources.

Multiple smart switches (multiple MIDs) can be configured to back up separate 200 A load panels. In such embodiments, each smart switch would require a corresponding combiner/gateway and can be set up as independent systems in backup mode. The smart switches can form a separate island with associated load panel during backup operation. In at least some embodiments, these islands do not need to be connected to each other during backup operation, and the loads, storage system, and PV modules that are within each island can be separated from the rest of the energy management system via each smart switch.

The smart switch 110 communicates with the gateway 1200 over one or more suitable wireless interfaces (e.g., with IEEE 802.15.4 specification, to create personal area networks that require a low data transfer rate, energy efficiency and secure networking). To this end, a wireless adapter (USB dongle) can be configured to connect to a USB port located on the combiner/gateway (e.g., located inside the combiner/gateway enclosure). In at least some embodiments, the wireless adapter can be configured as a failsafe mechanism. In such embodiments, the wireless adaptor can be configured to operate in two or more frequency bands, e.g., 2.4 GHz and 915 MHz; the former being the primary band of communication, and if the primary communication fails, the smart switch establishes the communication with the latter.

Figure 19:
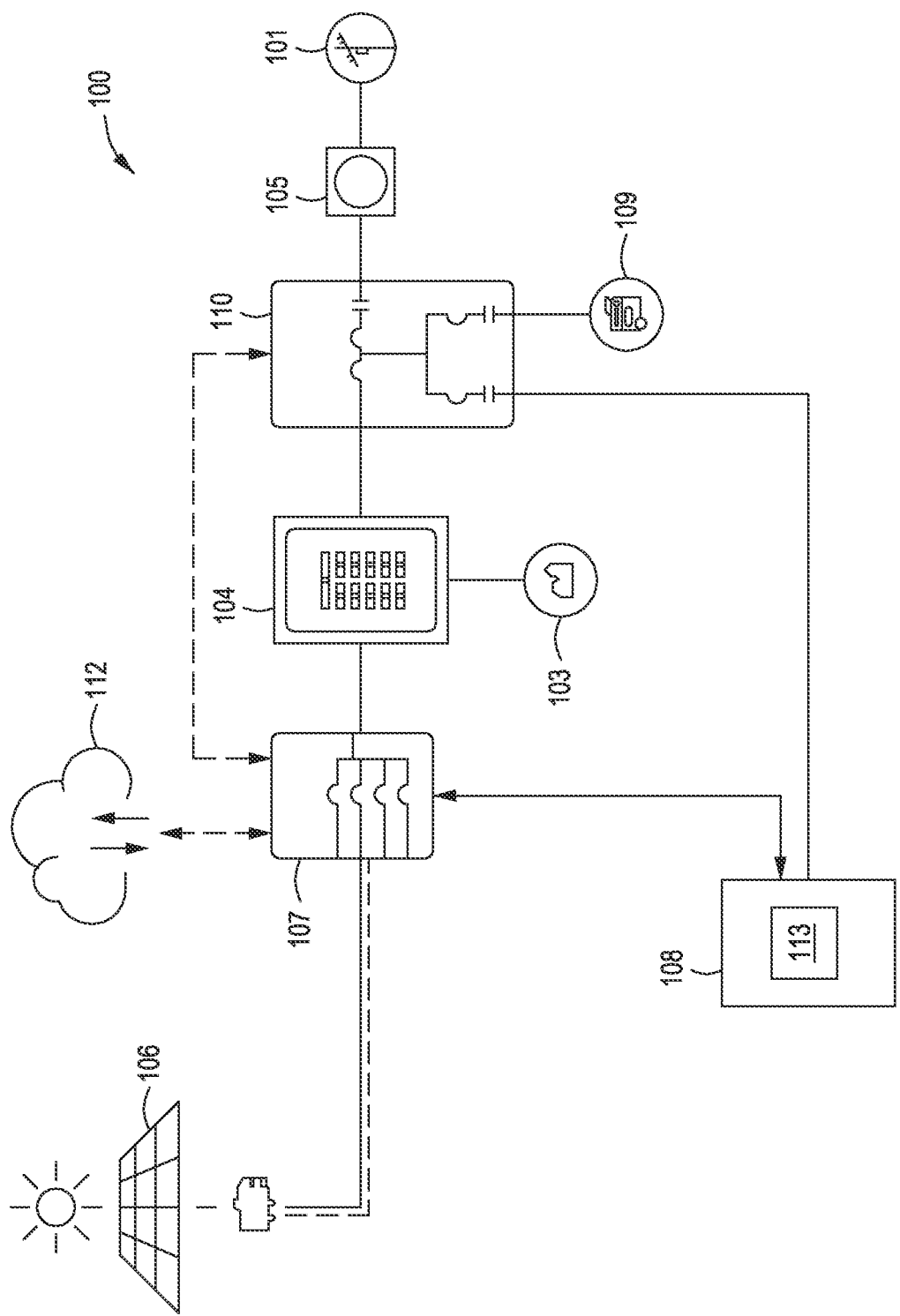
FIG. 19 is a diagram of a backup configuration supported by the energy management system, in accordance with at least some embodiments of the present disclosure.

In addition to the installed configuration of FIG. 1, the energy management system 100 can be installed in other configurations. For example, FIG. 19 illustrates a whole home backup with the energy management system 100 at the service entrance and combiner 107 (or gateway 1200) connected to the main load panel 104. When a user backs up the main load panel 104, a size of the combiner circuit in the combiner 107 can be about 80 A, and the combiner 107 connection space in the smart switch 110 can be left vacant. Accordingly, when existing combiners are connected to the main load panel 104, a user can add additional storage systems including the SP battery 200 and/or the 3P battery 202 to the energy management system 100, a user can keep the combiner connected to the main load panel 104 and connect the storage system 108 and/or additional SP batteries and 3P batteries to the smart switch 110.

Figure 20:
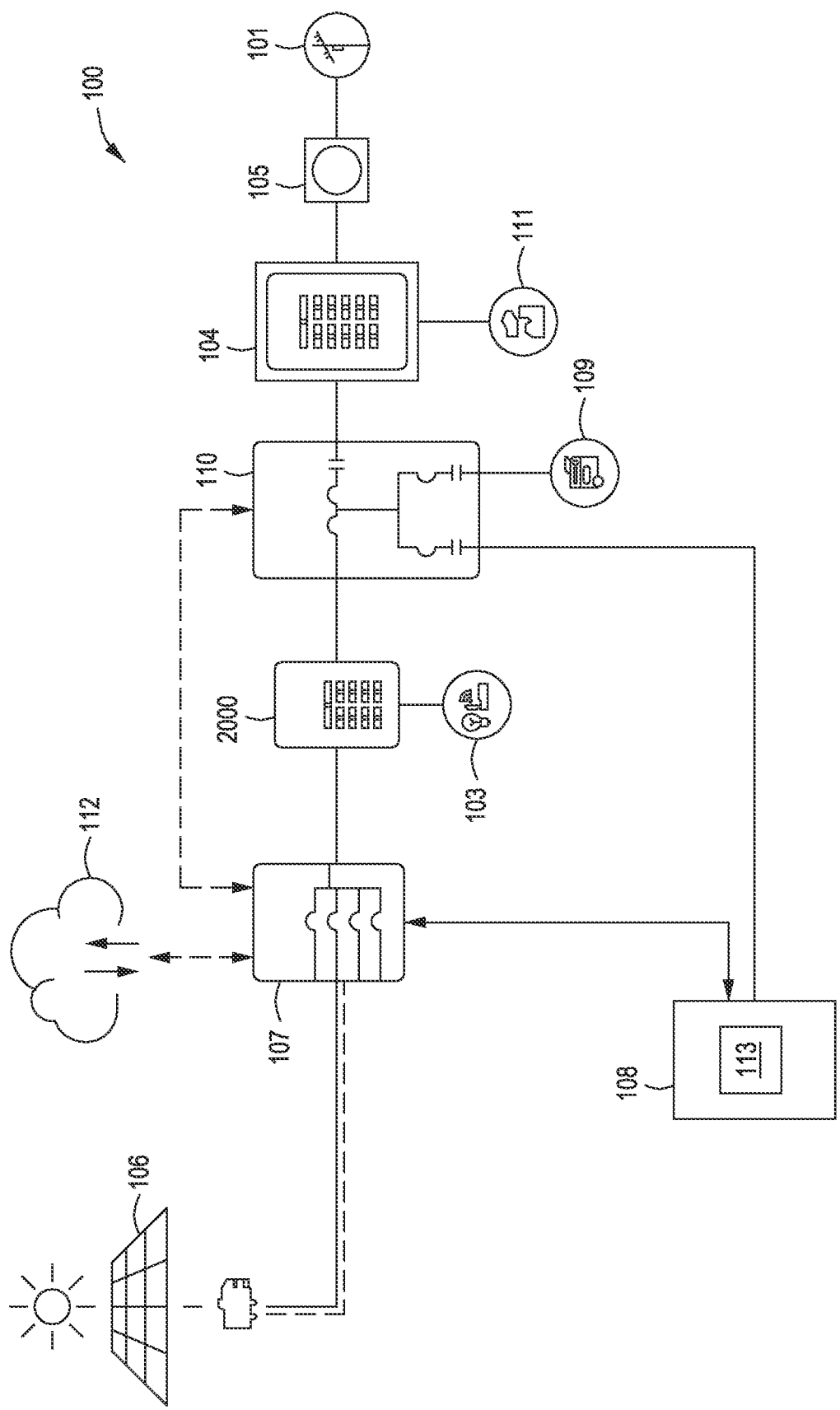
FIG. 20 is a diagram of a backup configuration supported by the energy management system, in accordance with at least some embodiments of the present disclosure.

FIG. 20 is a diagram of backup configurations supported by the energy management system 100, in accordance with at least some embodiments of the present disclosure. The energy management system 100 can be configured for partial home back up using the subpanel 2000 backup for the loads 103 (e.g., critical or backup loads), with the main load panel 104, which is connected to other loads 111 (e.g., non-critical/non-essential loads), at the service entrance and the combiner 107 connected to the subpanel 2000, e.g., when the PV 106 circuit is more than 80 A. The space available in the smart switch 110 of the energy management system 100 for the combiner 107 connection can be left vacant.

Figure 21:
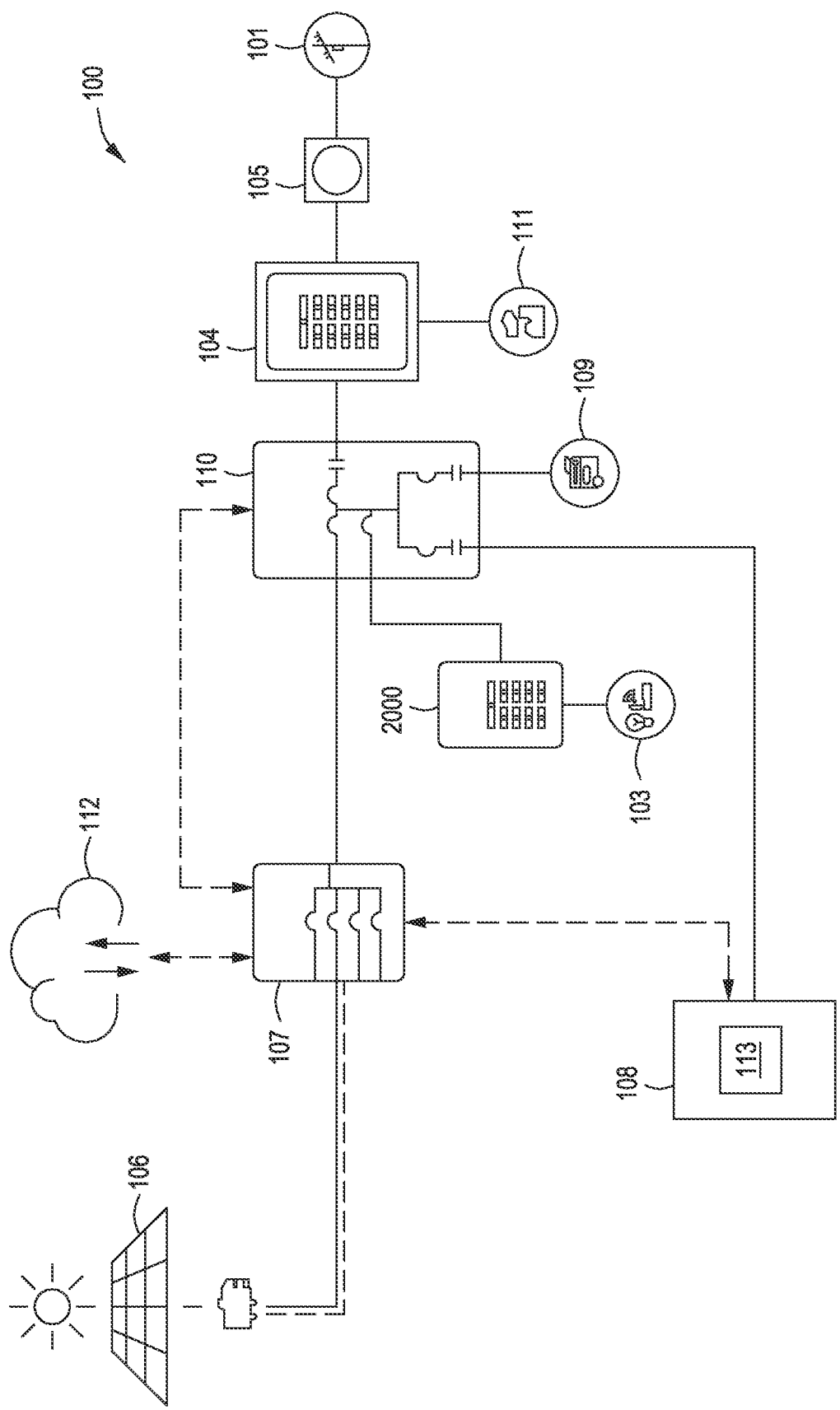
FIG. 21 is a diagram of a backup configuration supported by the energy management system, in accordance with at least some embodiments of the present disclosure.

FIG. 21 is a diagram of backup configurations supported by the energy management system 100, in accordance with at least some embodiments of the present disclosure. The energy management system 100 can be configured for partial home back up using the subpanel 2000 (e.g., critical loads) backup with the main load panel 104 at a service entrance and the combiner 107 connected to the smart switch 110 of the energy management system 100, e.g., when the PV 106 circuit and storage system 108 are less than 80 A.

Figure 22:
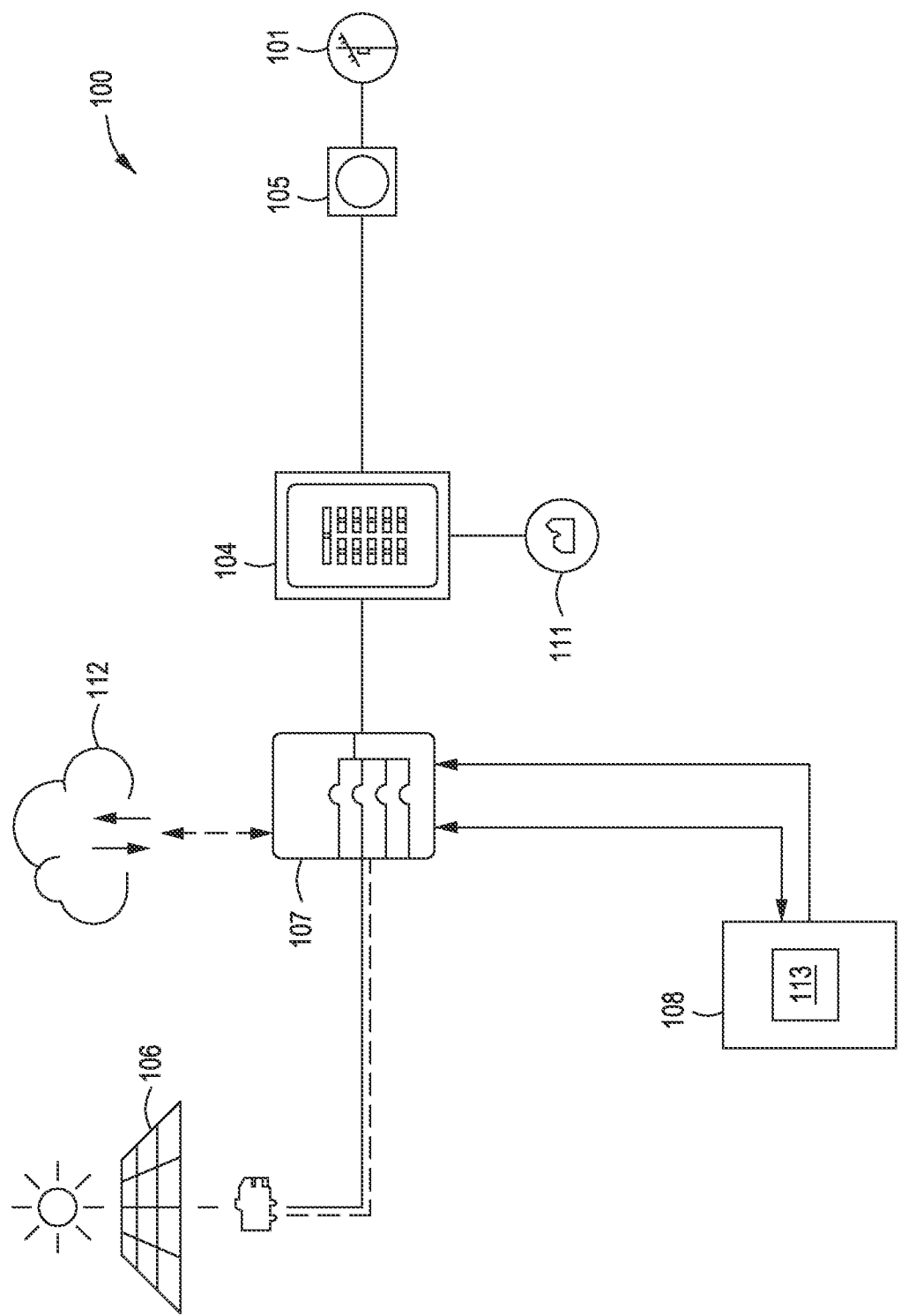
FIG. 22 is a diagram of a backup configuration supported by the energy management system, in accordance with at least some embodiments of the present disclosure.

FIG. 22 is a diagram of backup configurations supported by the energy management system 100, in accordance with at least some embodiments of the present disclosure. In at least some embodiments, the energy management system 100 can be configured for self-consumption, e.g., with no smart switch. In such a configuration, when adding the storage system 108 including the SP battery 200 and/or the 3P battery 202 and the combiner 107 for self-consumption in a grid-tied application, e.g., with no option for backup during outages, the combiner 107 and storage system 108 will not operate when the grid is unavailable.

In at least some embodiments, the energy management system 100 for partial backup can be configured with different utility breaker downgrades. For example, for a 200 A main panel busbar (e.g., 120% capacity it 240 A), a breaker downgrade for a 200 A utility breaker can be calculated using 240 A−200 A=40 A total capacity available for PV and storages and for a breaker downgrade for 150 A utility breaker, then 240 A−150 A=90 A total capacity available for PV and storage. Other calculations can also be used for determining utility breaker downgrades.

In at least some embodiments, when the energy management system 100 is configured for whole backup, as the PVs 106 and storage system 108 is connected to the smart switch 110 on a utility side of the main load panel 104, a main panel upgrade is not required, and the main load panel 104 is still protected by the main load panel 104 main breaker that was protecting main load panel 104 prior to connecting the PVs 106 and storage system 108, e.g., no violation of 120% rule. Similarly, when the energy management system 100 is configured for partial backup, e.g., by downsizing the utility breaker in the main load panel 104, MPU can also be avoided. For example, for a 200 A main load panel, by downsizing the 200 A breaker to 150 A, 90 A of the PVs 106 and storage system 1008 capacity will be available without an MPU.

Some of the advantages of the energy management system 100 can include, but are not limited to: reliability including proven high reliability IQ series micros, distributed AC architecture vs single point of failure for string inverters and DC coupled solutions, passive cooling (no moving parts, fans, and pumps with high failure rates), and single reliable partner for all customer needs: install, monitor, customer service, & warranty; scalability including flexible PV and storage solution for new and retrofit installs, 3.36 kWh/1.28 kW increments of battery storage, and AC-coupled with ease of expandability in future; smartness including simple and easy to design and install and integrated controls, seamless transition to backup, and wireless communications; and safety including safety of AC voltage, Safety of LFP cells, and best in class safety for battery storage: UN38.3, UL1973, UL1998, UL991, 9540, 9540A.

While the foregoing is directed to embodiments of the present disclosure, other and further embodiments of the disclosure may be devised without departing from the basic scope thereof, and the scope thereof is determined by the claims that follow.

What is claimed is:

1. A storage system configured for use with an energy management system, comprising:

a single-phase AC coupled battery or a three-phase AC coupled battery;

a plurality of microinverters that are configured to connect to one or more battery cells that form a local grid;

a controller configured to detect when to charge or discharge the single-phase AC coupled battery or the three-phase AC coupled battery so that energy can be stored therein when energy is abundant and used when energy is scarce; and a server-based interface configured to provide a state-of-charge estimation based on a self-discharge rate of the storage system, send notifications when the storage system is not communicating via a gateway of the energy management system, and provide an estimator tool for storage system sizing and photovoltaic sizing and at least one of single-phase AC coupled battery and three-phase AC coupled battery profiles to optimize at least one of self-consumption or time-of-use or troubleshooting capabilities to identify issues with the energy management system.

2. The storage system of claim 1, wherein the single-phase AC coupled battery or the three-phase AC coupled battery are configured to respond to a commanded charge or discharge at a given C-rate and receive at least one of a predefined hourly, daily, and monthly schedule for charge and discharge at different C-rates.

3. The storage system of claim 1, wherein the single-phase AC coupled battery and the three-phase AC coupled battery are lithium-ion batteries comprising lithium ferrous phosphate batteries.

4. The storage system of claim 1, wherein the single-phase AC coupled battery has 3.36 kWh capacity and 1.28 kVA rated continuous output power, and wherein the three-phase AC coupled battery comprises three single-phase AC coupled batteries and has 10.08 kWh and 3.84 kVA rated continuous output power.

5. The storage system of claim 4, wherein adjacent ones of the three single-phase AC coupled batteries are connected to each other via a raceway.

6. The storage system of claim 5, wherein the raceway comprises a body, an arm, a snap feature, and a pair of O-rings disposed between the snap feature and the arm.

7. The storage system of claim 1, wherein the single-phase AC coupled battery and the three-phase AC coupled battery comprise an integrated DC disconnect switch.

8. The storage system of claim 1, further comprising a first covering that is configured to enclose the single-phase AC coupled battery or a second covering that is configured to enclose the three-phase AC coupled battery.

9. The storage system of claim 1, further comprising a first mount configured to connect to the single-phase AC coupled battery for mounting the single-phase AC coupled battery or a second mount configured to connect to the three-phase AC coupled battery for mounting the three-phase AC coupled battery.

10. The storage system of claim 9, wherein each of the first mount and the second mount comprises top tabs, a bracket shelf, and a screw hole that aligns with a corresponding screw hole on a top of the single-phase AC coupled battery or the three-phase AC coupled battery.

11. The storage system of claim 1, wherein each of the single-phase AC coupled battery and the three-phase AC coupled battery comprises at least one of an LED display or a plurality of LEDs.

12. The storage system of claim 11, wherein each of the LED display and the plurality of LEDs are configured to display performance information, cell information of the single-phase AC coupled battery and the three-phase AC coupled battery, microinverter status information, guidance to a technician and a status information of the single-phase AC coupled battery or the three-phase AC coupled battery including battery failure, microinverter failure, or firmware upgrade.

13. The storage system of claim 1, wherein the plurality of microinverters are configured to communicate with each other and the controller via power line communication.

14. The storage system of claim 1, wherein the controller including each of the single-phase AC coupled battery and the three-phase AC coupled battery is configured to support wireless communications to communicate with the gateway of the energy management system.

15. The storage system of claim 14, wherein the controller is configured to receive frequency and voltage values from the gateway to control the plurality of microinverters and determine a charge and discharge power of each of the single-phase AC coupled battery and the three-phase AC coupled battery.

16. The storage system of claim 1, wherein the controller is further configured to provide a cloud interface configured to provide real-time power flow with local grid connectivity status.

17. An energy management system comprising:
   a smart switch including an input that is configured to connect to one of meter at a service entrance or a main load panel, wherein the smart switch is configured to support one of whole home backup, partial home backup, and subpanel backup;
   a storage system connected to the smart switch, wherein the storage system comprises:
   a single-phase AC coupled battery or a three-phase AC coupled battery;
   a plurality of microinverters that are configured to connect to one or more battery cells that form a local grid;
   a controller configured to detect when to charge or discharge the single-phase AC coupled battery or the three-phase AC coupled battery so that energy can be stored therein when energy is abundant and used when energy is scarce; and
   a server-based interface configured to provide a state-of-charge estimation based on a self-discharge rate of the storage system, send notifications when the storage system is not communicating via a gateway of the energy management system, and provide an estimator tool for storage system sizing and photovoltaic sizing and at least one of single-phase AC coupled battery and three-phase AC coupled battery profiles to optimize at least one of self-consumption or time-of-use or troubleshooting capabilities to identify issues with the energy management system.

18. The energy management system of claim 17, wherein the single-phase AC coupled battery or the three-phase AC coupled battery are configured to respond to a commanded charge or discharge at a given C-rate and receive at least one of a predefined hourly, daily, and monthly schedule for charge and discharge at different C-rates.

* * * * *